(12) United States Patent
Adams et al.

(10) Patent No.: US 7,762,278 B2
(45) Date of Patent: *Jul. 27, 2010

(54) VALVES FOR FUEL CARTRIDGES

(75) Inventors: Paul Adams, Monroe, CT (US); Floyd Fairbanks, Naugatuck, CT (US); Andrew J. Curello, Hamden, CT (US); Anthony Sgroi, Jr., Wallingford, CT (US)

(73) Assignee: Societe BIC (FR)

( * ) Notice: Subject to any disclaimer, the term of this patent is extended or adjusted under 35 U.S.C. 154(b) by 1576 days.

This patent is subject to a terminal disclaimer.

(21) Appl. No.: 10/978,949

(22) Filed: Nov. 1, 2004

(65) Prior Publication Data

US 2010/0099009 A1    Apr. 22, 2010

Related U.S. Application Data

(63) Continuation-in-part of application No. 10/629,006, filed on Jul. 29, 2003, now Pat. No. 7,537,024.

(51) Int. Cl.
*F16L 37/32* (2006.01)

(52) U.S. Cl. ............... 137/614.04; 137/550; 251/149.1; 251/149.6

(58) Field of Classification Search .... 137/614–614.05, 137/544, 549, 550; 251/149.1, 149.6
See application file for complete search history.

(56) References Cited

U.S. PATENT DOCUMENTS

| | | | | |
|---|---|---|---|---|
| RE23,487 | E * | 4/1952 | McCabe, Jr. | 137/614 |
| 3,938,564 | A * | 2/1976 | Jones | 141/352 |
| 5,042,678 | A * | 8/1991 | Munguia | 220/254.9 |
| 5,090,448 | A * | 2/1992 | Truchet | 137/614.03 |
| 5,544,785 | A * | 8/1996 | Frigiere | 222/3 |
| 6,523,863 | B2 * | 2/2003 | Ishiwata | 137/614.03 |
| 6,644,331 | B2 * | 11/2003 | Arisato | 137/614.03 |
| 7,537,024 | B2 * | 5/2009 | Adams et al. | 137/614.04 |

OTHER PUBLICATIONS

Four images of Intravenous bag valves (discussed on p. 12 of the Amendment dated Dec. 7, 2007).

* cited by examiner

*Primary Examiner*—Kevin L Lee
(74) *Attorney, Agent, or Firm*—The H.T. Than Law Group

(57) ABSTRACT

Valves for connecting fuel supplies are disclosed. The fuel supplies can be a pressurized or non-pressurized cartridge that can be used with any fuel cells. The valves may include valves that vent gas from the cartridge and allow byproducts produced by the fuel cell to be transported to the fuel cartridge, and valves that connect the fuel supplies to the fuel cells.

61 Claims, 14 Drawing Sheets

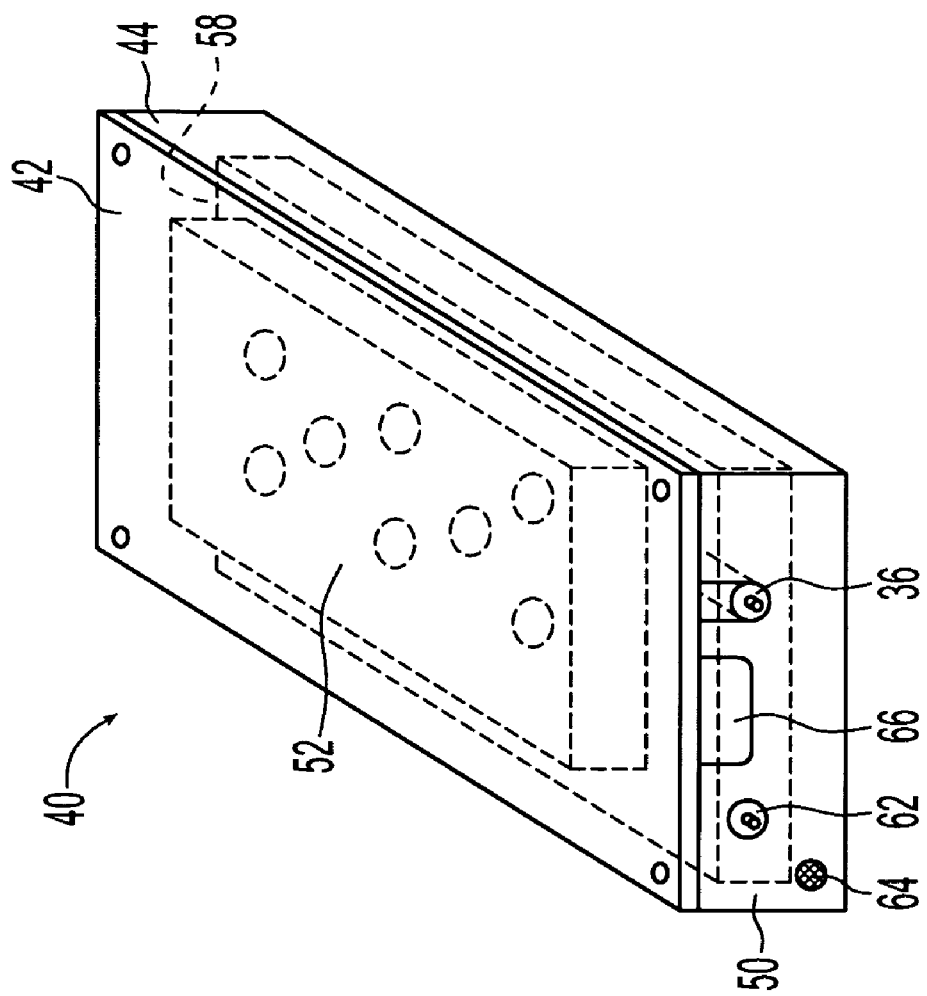
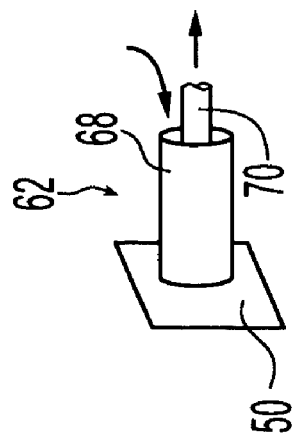
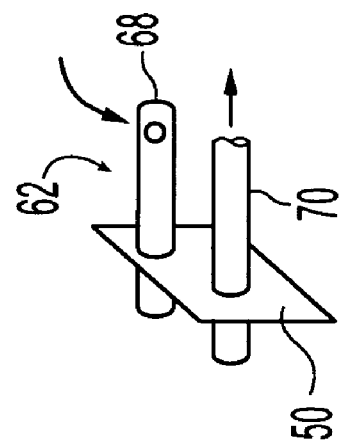

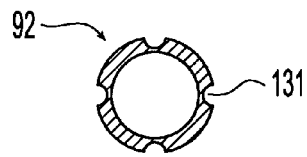
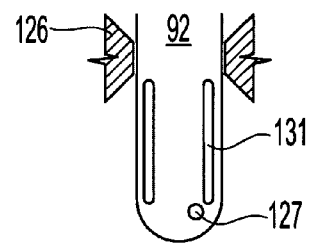
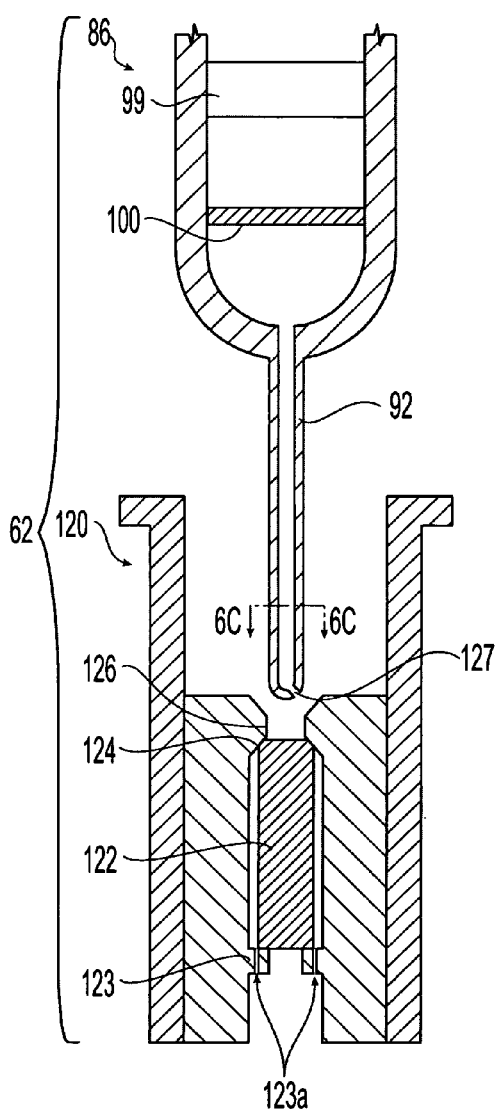
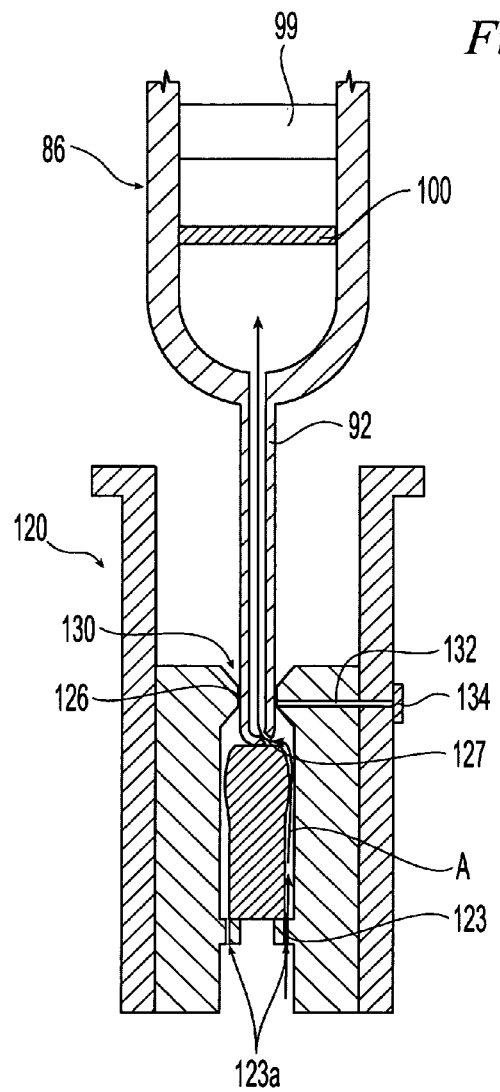
Fig. 6C
Fig. 6D
Fig. 6A
Fig. 6B

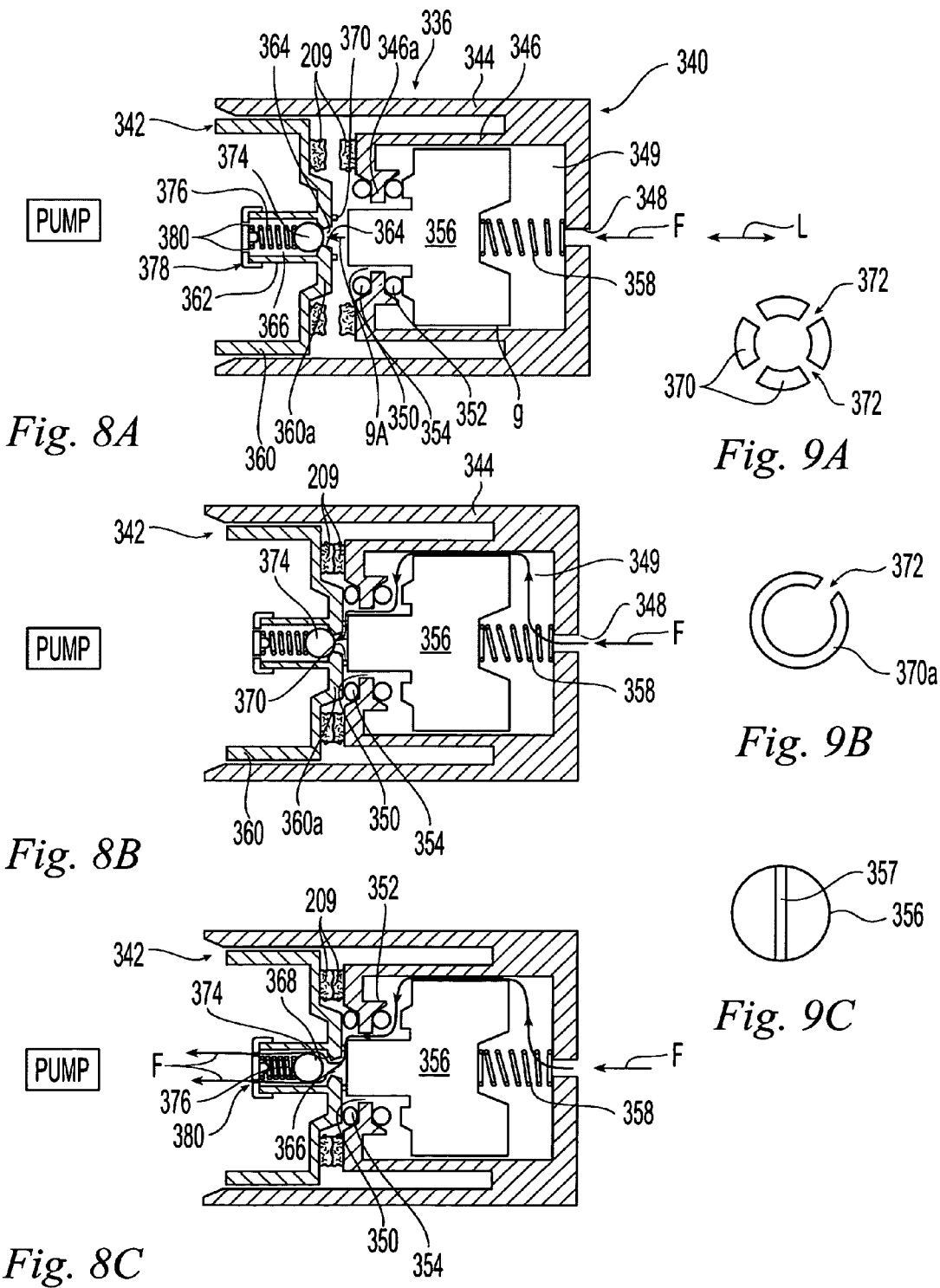

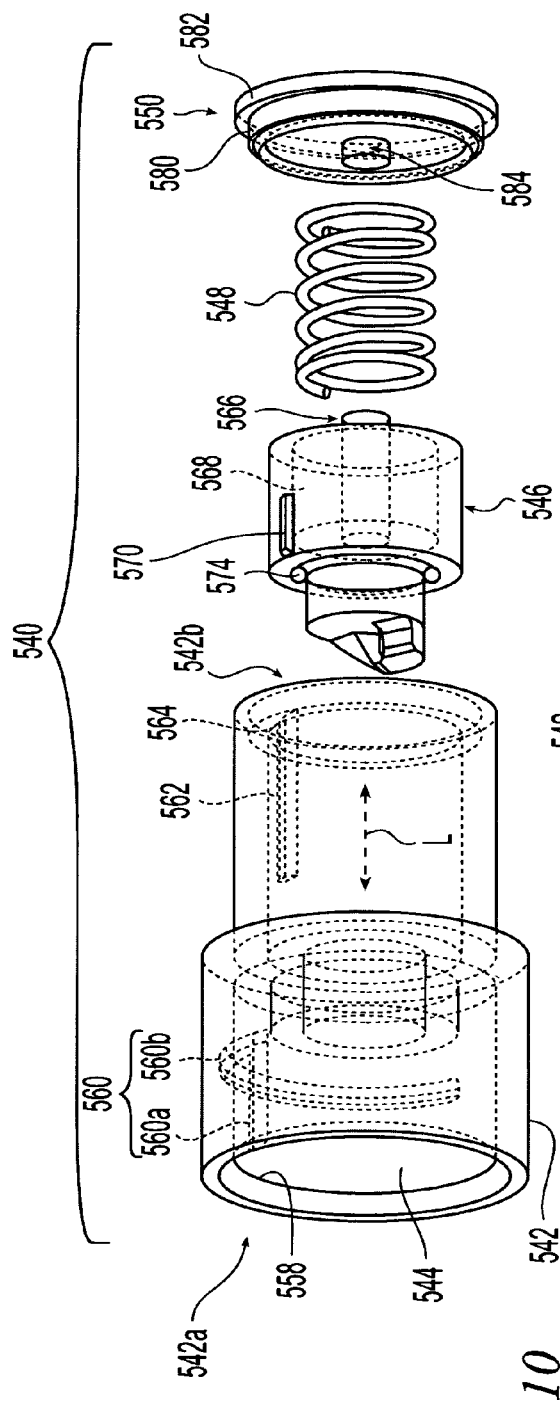
Fig. 10
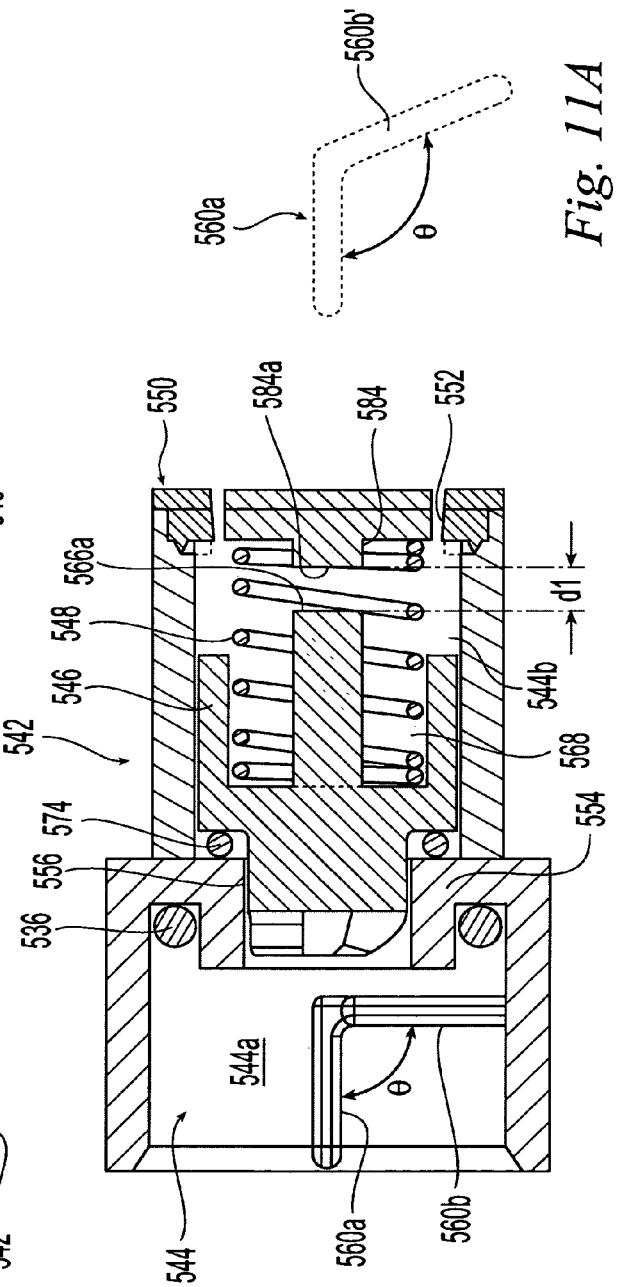
Fig. 11
Fig. 11A

VALVES FOR FUEL CARTRIDGES

CROSS-REFERENCE TO RELATED APPLICATIONS

This application is a continuation-in-part of patent application entitled "Fuel Cartridge with Connecting Valve," bearing application Ser. No. 10/629,006, filed on Jul. 29, 2003, now U.S. Pat. No. 7,537,024. The disclosure of this parent application is incorporated herein by reference in its entirety.

FIELD OF THE INVENTION

This invention generally relates to valves for cartridges supplying fuel to various fuel cells, valves for the fuel cells and valves for fuel refilling devices.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely (i) fuel cells utilizing compressed hydrogen ($H_2$) as fuel, (ii) proton exchange membrane (PEM) fuel cells that use methanol ($CH_3OH$), sodium borohydride ($NaBH_4$), hydrocarbons (such as butane) or other fuels reformed into hydrogen fuel, and (iii) PEM fuel cells that can consume non-hydrogen fuel directly or direct oxidation fuel cells. The most common direct oxidation fuel cells are direct methanol fuel cells or DMFC. Other direct oxidation fuel cells include direct ethanol fuel cells and direct tetramethyl orthocarbonate fuel cells.

Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode, and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$O_2 + 4H^+ + 4e^- \rightarrow 2H_2O$$

The overall fuel cell reaction:

$$CH_3OH + 1.5O_2 \rightarrow CO_2 + 2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants, laptop computers and power tools, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated sulfuric acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

As discussed above, for other fuel cells fuel is reformed into hydrogen and the hydrogen reacts with oxidants in the fuel cell to produce electricity. Such reformat fuel includes many types of fuel, including methanol and sodium borohydride. The cell reaction for a sodium borohydride reformer fuel cell is as follows:

$$NaBH_4 + 2H_2O \rightarrow (\text{heat or catalyst}) \rightarrow 4(H_2) + (NaBO_2)$$

$$H_2 \rightarrow 2H^+ + 2e^- \text{ (at the anode)}$$

$$2(2H^+ + 2e^-) + O_2 \rightarrow 2H_2O \text{ (at the cathode)}$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in U.S. Pat. No. 4,261,956, which is incorporated herein by reference.

Valves are needed for transporting fuel between fuel cartridges, fuel cells and/or fuel refilling devices. The known art discloses various valves and flow control devices such as those described in U.S. Pat. Nos. 6,506,513 and 5,723,229 and in U.S. published application nos. 2003/0082427 and 2002/0197522. A need, however, exists for improved valves that allow venting of gas, maintaining seals, improving the flow of fuel through the valve, among other things.

SUMMARY OF THE INVENTION

Hence, the present invention is directed to a valve adapted for use with a fuel cartridge and an electronic device powered by a fuel cell to vent byproducts from the cartridge. The valve comprises a vent nozzle, which can be positioned on the fuel cell or the electronic device. The vent nozzle comprises a first channel and is adapted to open a seal in a valve component positioned on the fuel cartridge so that a gas byproduct contained in the fuel cartridge is transported through the vent nozzle and vented from the fuel cartridge. Preferably, the first channel is in fluid communication with a gas permeable, liquid impermeable membrane and/or a fuel vapor absorbent material. The first channel can be in fluid communication with a check valve positioned in the vent nozzle, wherein the check valve opens at a predetermined pressure to vent the gas. The gas may be vented through the fuel cell or the electronic device to the atmosphere.

In another embodiment of the present invention, the vent nozzle further comprises a second channel. In such an embodiment, byproducts from the fuel cell may be transported through the second channel to the fuel cartridge.

The present invention is further directed to a valve comprising first and second valve components. The first valve component has a first internal seal connectable to one of either a fuel supply or a fuel cell. The second valve component has a second internal seal connectable to the other of either the fuel supply or the fuel cell. At least the first valve component comprises a housing and an elastic inner body, and wherein the elastic inner body cooperates with a sealing surface to form the first internal seal in the first valve component. Upon connection of the first valve component to the second valve component, the inner body is compressed to open the first internal seal to establish a fluid flow path through the first valve component. Preferably, during connection of the first valve component to the second valve component, an inter-component seal is formed at least before opening of the first internal seal. The elastic inner body can have straight, uniform thickness sidewall, non-linear sidewall, or non-uniform thickness sidewall.

The present invention is also directed to a valve comprising first and second valve components. The second valve component is connectable to the first valve component such that a fluid flow path is established therebetween. At least one fluid absorbent member is disposed proximate to the first and second valve components. Preferably, the fluid absorbent member is located substantially between the interface between the first valve component and the second valve component. The absorbent materials can also be attached to the fuel supply near the fuel supply's valve component or to the device near the device's valve component, or both.

Additionally, the present invention is directed to a valve comprising a first valve component and a second valve component connectable to the first valve component such that a fluid flow path is established through the two valve components. At least one rib is positioned between the first and second valve components and wherein the rib defines a gap, and said fluid flow path includes fluid flow through the gap.

Moreover, the present invention is directed to a valve comprising a first valve component and a corresponding second valve component connectable to the first valve component such that a fluid flow path is established through the two valve components. The fluid flow path includes a channel defined on a surface of a plunger located in the first or second valve component and wherein the surface is located opposite to the corresponding valve component.

The present invention is also directed to a valve comprising a first valve component and a second valve component connectable to the first valve component such that a flow path is established through the first and second valve components. The first and second valve components are movable in at least two directions relative to each other to establish the flow path.

The valve of the present invention can have a filter associated with one or both valve components to keep non-fuel objects from the valve.

BRIEF DESCRIPTION OF THE DRAWINGS

In the accompanying drawings, which form a part of the specification and are to be read in conjunction therewith and in which like reference numerals are used to indicate like parts in the various views:

FIG. 2 is a perspective view of the cartridge of FIG. 1 in a closed position;

FIGS. 2A and 2B are perspective views of other gas vent valves;

FIG. 6A is an enlarged, exploded, cross-sectional view of a vent nozzle connectable to a vent valve, wherein the vent nozzle is out of contact with a spring so that the venting valve is closed;

FIG. 6B is an enlarged, cross-sectional view of the vent nozzle and venting valve of FIG. 6A with a modification, wherein the vent nozzle is connected to the venting valve and in contact with and compressing the spring so that the venting valve is open;

FIG. 6C is a cross-sectional view of a portion of the valve of FIG. 6A along line 6C-6C;

FIG. 6D is an alternative embodiment of the vent nozzle of FIG. 6A;

FIG. 8A is a cross-sectional view of first and second connecting valve components according to another aspect of the present invention, wherein the components are out of contact;

FIG. 8B is a cross-sectional view of the two components of FIG. 8A in contact with one another but fuel cannot flow from the cartridge to the fuel cell;

FIG. 8C is a cross-sectional view of the two components of FIG. 8A, wherein the components are in contact to allow fuel to flow from the cartridge to the fuel cell;

FIG. 9A is an end view of a portion of an outer housing of the second valve component of FIG. 8A along arrow 9A;

FIG. 9B is an end view of an alternative portion of the outer housing of the second valve component of FIG. 9A;

FIG. 9C is a front view of a plunger of the first valve component of FIGS. 8A and 8B showing a flow channel;

FIG. 10 is an exploded, perspective view of a first connecting valve component according to another aspect of the present invention;

FIG. 11 is an enlarged, cross-sectional view of the component of FIG. 10 in an assembled state with a plunger at an initial position;

FIG. 11A is an enlarged, plan view of an alternative groove for use on the component of FIG. 11;

DETAILED DESCRIPTION OF THE PREFERRED EMBODIMENTS

Figure 1:
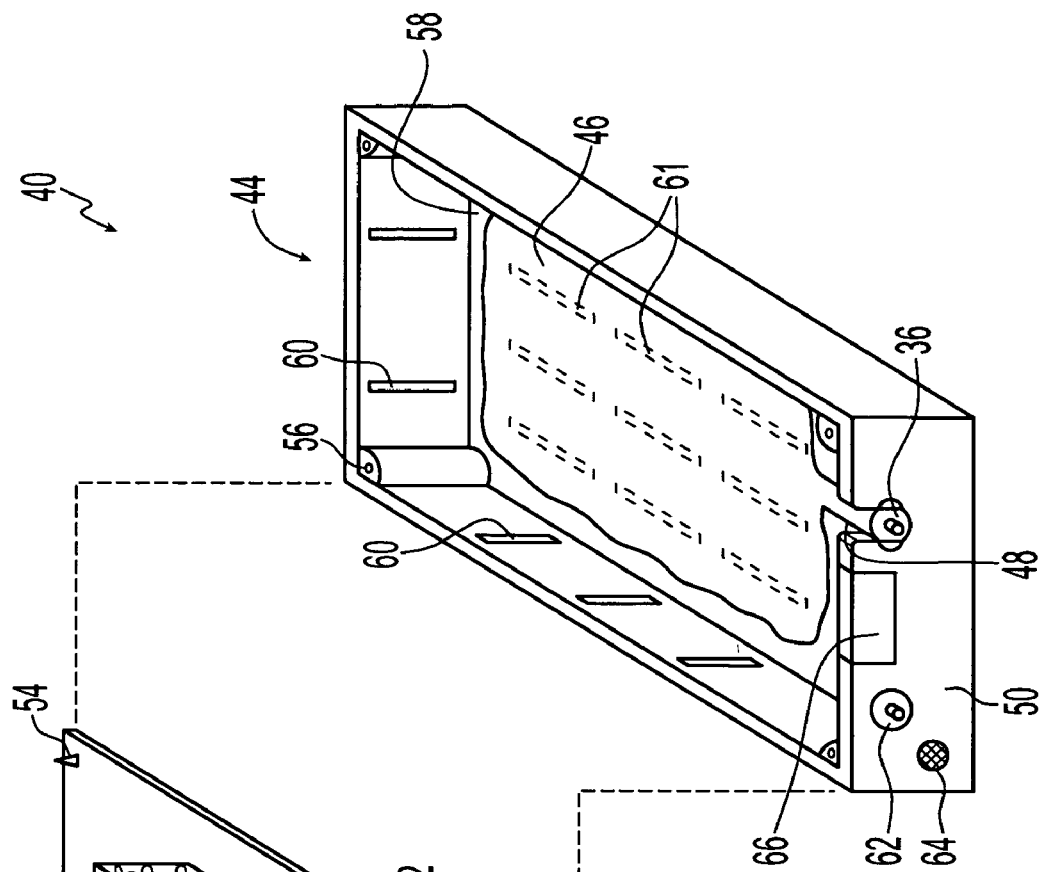
FIG. 1 is an exploded, perspective view of a fuel cartridge of an embodiment of the present invention in an open position.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or alcohols, metal hydrides, such as sodium borohydrides, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a metal hydride such as sodium borohydride ($NaBH_4$) and water, discussed above and the low pressure, low temperature produced by such reaction. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gases, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications include, but are not limited to, storing hydrocarbons and hydrogen fuels for micro gas-turbine engines built on silicon chips, discussed in "Here Come the Microengines," published in The Industrial Physicist, (December 2001/January 2002) at pp. 20-25. For the purpose of the present application, "fuel cells" also include these micro-engines. Other applications include storing traditional fuels for internal combustion engines, hydrocarbons such as butane for pocket and utility lighters, and liquid propane.

Suitable fuel supplies include those disclosed in commonly owned, co-pending U.S. patent application Ser. No. 10/356, 793, entitled "Fuel Cartridge for Fuel Cells," filed on Jan. 31, 2003. The disclosure of this application is hereby incorporated in its entirety. An embodiment of a suitable fuel cell cartridge is shown in FIG. 1. Cartridge 40 may contain any type of fuel cell fuel, as discussed above. Cartridge 40 comprises housing top 42 and housing body 44. Body 44 is configured and dimensioned to receive fuel bladder or fuel liner 46. Fuel liners are fully disclosed in commonly owned, co-pending U.S. patent application Ser. No. 10/629,004, entitled "Fuel Cartridge with Flexible Liner," filed on Jul. 29, 2003. The disclosure of this application is hereby incorporated by reference in its entirety. Liner 46 is connected to shut-off or connecting valve 36.

Figure 1A:
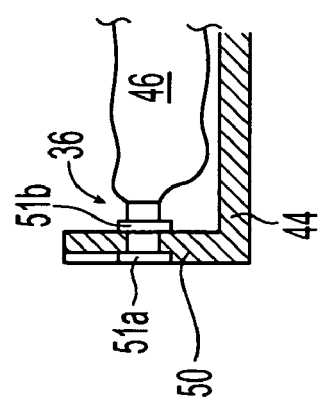
FIG. 1A is a cross-sectional view of a valve connectable to a liner in the cartridge of FIG. 1.

Suitable shut-off valves include those disclosed in the parent application, which is commonly owned, co-pending, incorporated patent application Ser. No. 10/629,006, entitled "Fuel Cartridge for Fuel Cells," filed on Jul. 29, 2003. Valve 36 can be used to fill liner 46 with fuel, and valve 36 can also be used to selectively transport fuel from liner 46 to the fuel cell. In one aspect, valve 36 is mounted on upstanding endwall 50 of body 44. Endwall 50 defines slot 48, which is adapted to receive valve 38. As shown in FIG. 1A, valve 36 comprises two external flanges 51a,b that straddle endwall 50 to secure valve 36 in place. Preferably, outer flange 51a is flush with the outer surface of endwall 50, as shown. After valve 36 is seated, slot 48 can be sealed with a plug, an O-ring, or a gasket (not shown) inserted into slot 48. The plug, O-ring, or gasket can be made from elastomeric or rubber or filler materials among other suitable sealing materials. Slot 48 can also be sealed by ultrasonic welding.

In this embodiment, top 42 has compressible foam 52 affixed to its inside surface. Foam 52 can be single layer or multi-layer foam. Foam 52 can be positioned adjacent to liner 46 before liner 46 is filled or foam 52 can be compressed by the assembly of cartridge 40 after liner 46 is filled.

Top 42 is placed on top of body 44 by means of guides 54 and corresponding holes 56. Top 42 can be attached to body 44 by any means known in the art, such as adhesive bonding, ultrasonic bonding, welding, radio frequency welding, heat sealing, or the like. Endwall 50 and the other sidewalls are similarly attached to each other and to bottom 58. Alternatively, the sidewalls are integrally formed to bottom 58, e.g., by injection molding, compression molding or thermal forming. Endwall 50 and the other sidewalls preferably have a plurality of guides 60 to guide the compression and expansion, respectively, of foam 52 and liner 46.

Endwall 50 may also include venting valve 62 and/or gas permeable, liquid impermeable membrane 64. Valves 62, 64 allow air to vent, when cartridge 40 is filled, or allow gas byproduct produced by the fuel cell reaction to vent during use. Connecting valve 36 and vent or venting valve 62 are further discussed below. Membrane 64 can be a gas permeable, liquid impermeable membrane to allow air to enter as fuel is consumed to minimize vacuum from forming inside cartridge 40. Such membranes can be made from polytetrafluoroethylene (PTFE), nylon, polyamides, polyvinylidene, polypropylene, polyethylene or other polymeric membrane. Commercially available hydrophobic PTFE microporous membrane can be obtained from W.L Gore Associates, Inc. and Milspore, Inc., among others. Goretex® is a suitable membrane. Goretex® is a microporous membrane containing pores that are too small for liquid to pass through, but are large enough to let gas through.

With reference to FIGS. 1 and 2, after top 42 is assembled on body 44, foam 52 should be flush or in contact with bottom 58 and empty liner 46. As fuel is pumped into cartridge 40 through shut-off valve 36, liner 46 expands and compresses foam 52. As foam 52 is compressed, it stores potential spring energy to pressurize liner 46 and assists in the transport of fuel to the fuel cell during use. Also, as fuel is pumped into cartridge 40, air trapped in cartridge 40 is vented through membrane 64. Alternatively, air may be vented through venting valve 62. As shown in FIGS. 2A and 2B in one embodiment, valve 62 comprises channels 68 and 70. Channel 68 allows air and other gases to vent, while channel 70 allows liquid and gas byproducts produced by the fuel cell to be transported to cartridge 40, if needed. As shown in FIG. 2A, channels 68 and 70 are co-axial to each other, i.e., one channel is positioned inside the other. Alternatively, channels 68 and 70 can be positioned side-by-side to each other (as shown in FIG. 2B). Alternatively, liner 46 can be pre-filled with fuel and then inserted into body 44 before top 42 is attached to body 44. Top 42 compresses foam 52 while being attached to body 44 to store spring potential energy in foam 52.

Figure 3:
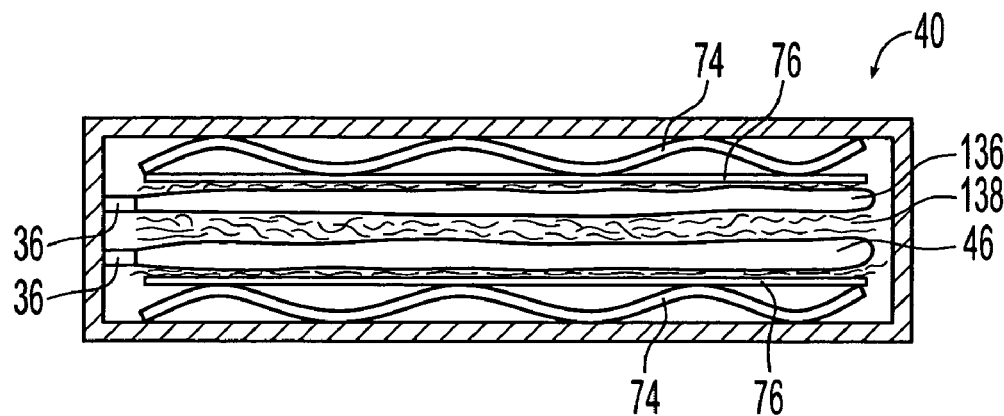
FIG. 3 is a schematic representation of another fuel cartridge in accordance to another embodiment of the present invention.
Figure 2C:
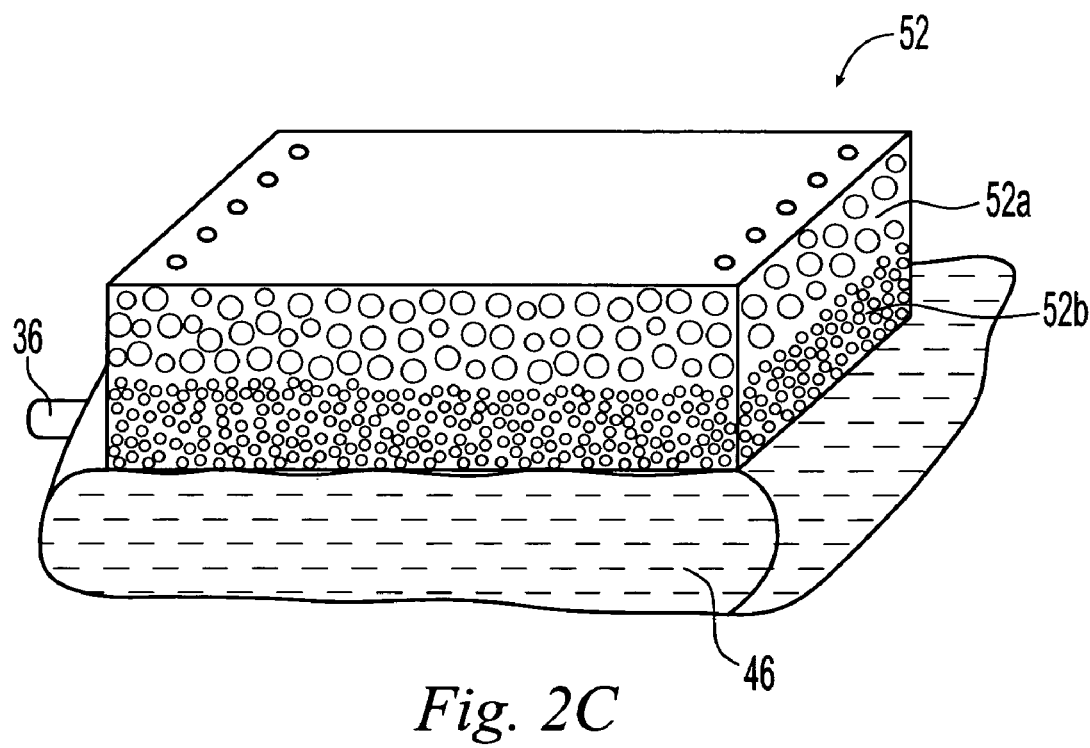
FIG. 2C is a perspective view of the liner and a foam spring with multiple zones.

Foam 52 may have varying porosity throughout its thickness as shown in FIG. 1 or may have a single layer or a plurality of layers 52a, b with varying porosity as shown in FIG. 2C. As illustrated in FIG. 3, foam 52 may be replaced by wave or leaf spring 74 and biased plate 76. Further details of cartridge 40, such as multiple liners 46, 136 and absorbent material 138, are disclosed in commonly owned co-pending U.S. patent application Ser. No. 10/679,756, entitled "Fuel Cartridges for Fuel Cells and Methods for Making Same," filed on Oct. 6, 2003. The disclosure of this application is hereby incorporated in its entirety.

Figures 4A, 4B:
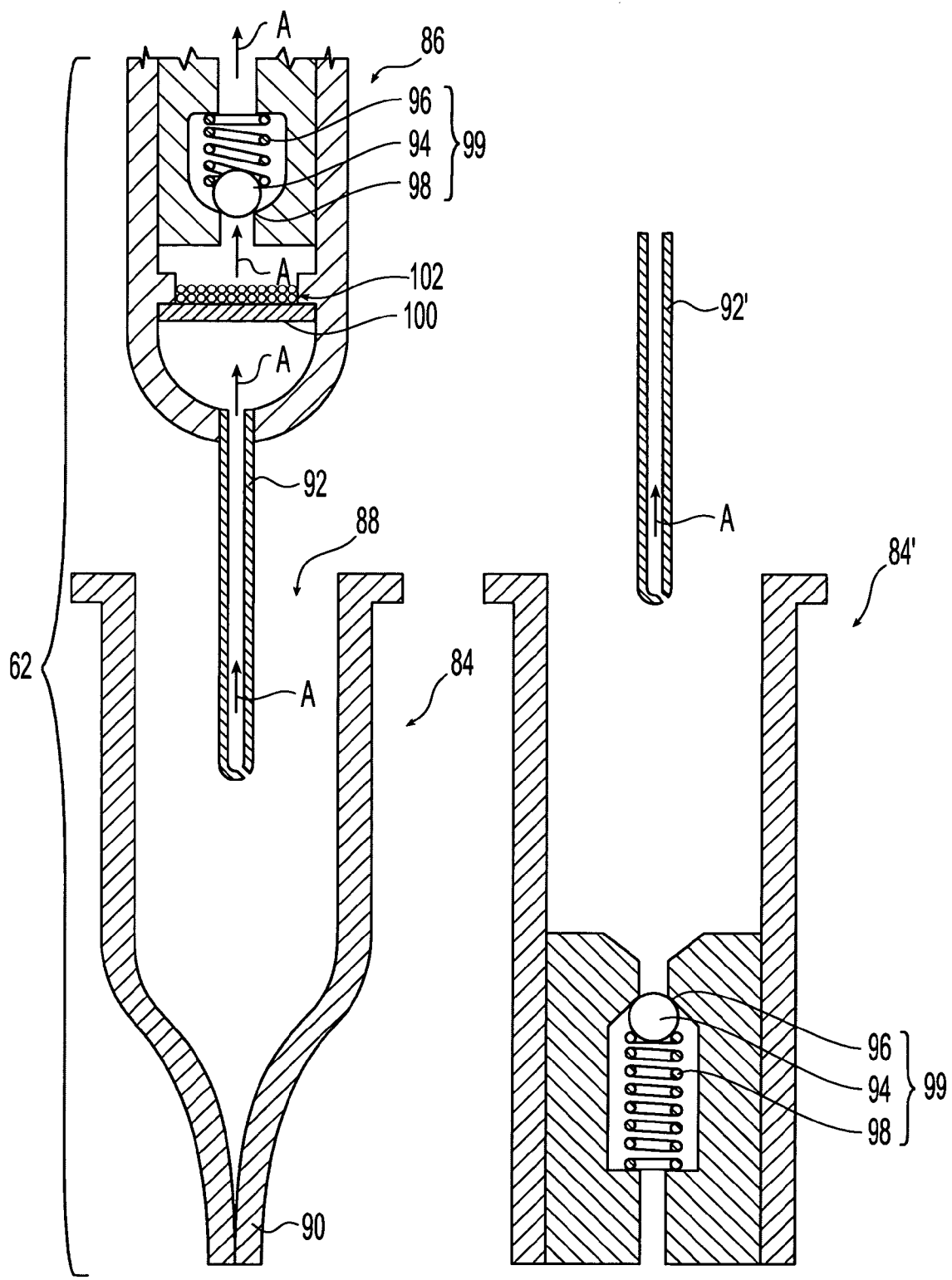
FIG. 4A is an enlarged, exploded, cross-sectional view of a venting valve according to one embodiment of the present invention.
FIG. 4B is an enlarged, exploded, cross-sectional view of an alternative embodiment of the venting valve of FIG. 4A.

Venting or vent valve 62 in accordance with one aspect of the present invention, as shown in FIG. 4A, comprises duckbill valve 84 and vent nozzle or needle 86. Duckbill valve 84 has opening 88 adapted to receive vent nozzle 86 and closed end 90 establishing a seal. Normally, duckbill valve 84 is attached to fuel cartridge 40 (in FIG. 1) and vent nozzle 86 is connected to the fuel cell (not shown) or the electronic device (not shown) or a refilling device (not shown). Hollow pushrod or needle 92 of vent nozzle 86 is inserted through closed end 90 to establish fluid communication between vent nozzle 86 and fuel cartridge 40. As internal pressure caused by the gas byproduct produced by the fuel cell and stored in cartridge 40 between liner 46 and housing 42, 44 (See FIG. 1) increases, a seal in vent nozzle 86 formed by ball 94 biased by spring 96 against sealing surface 98 opens to let the gas byproduct or other gases vent out of cartridge 40, as illustrated by arrows A, through the fuel cell or the electronic device and to the atmosphere. Collectively, ball 94 (or other shaped sliding or movable bodies), spring 96 and sealing surface 98 are referred herein as check valve 99. An exemplary gas byproduct is carbon dioxide ($CO_2$) produced by a direct methanol fuel cell. Additionally, to keep liquid from venting, vent nozzle 86 may also have a gas permeable, liquid impermeable membrane 100 disposed within vent nozzle 86. Membrane 100 can be made from the same material as membrane 64, described above. Furthermore, vent nozzle 86 optionally includes fuel absorbent material 102, such as fillers, granular charcoal, or the like, for absorbing fuel vapor that passes therethrough.

Alternatively, as shown in FIG. 4B, duckbill valve 84 can be replaced by valve component 84' having second check valve 99 or any other valve components disclosed in the parent patent application Ser. No. 10/629,006, which has been incorporated by reference above.

A readily apparent advantage of mounting vent nozzle 86 on the fuel cell or electronic device is that vent nozzle 86 and its components, especially membrane 100, are reusable. Only duckbill valve 84 or an alternate valve component 84' (shown in FIGS. 4A and 4B, respectively) is replaced if cartridge 40 is disposable, or when cartridge 40 is replaced. This reduces the costs and complexity of making fuel cartridges.

Figures 5, 5A:
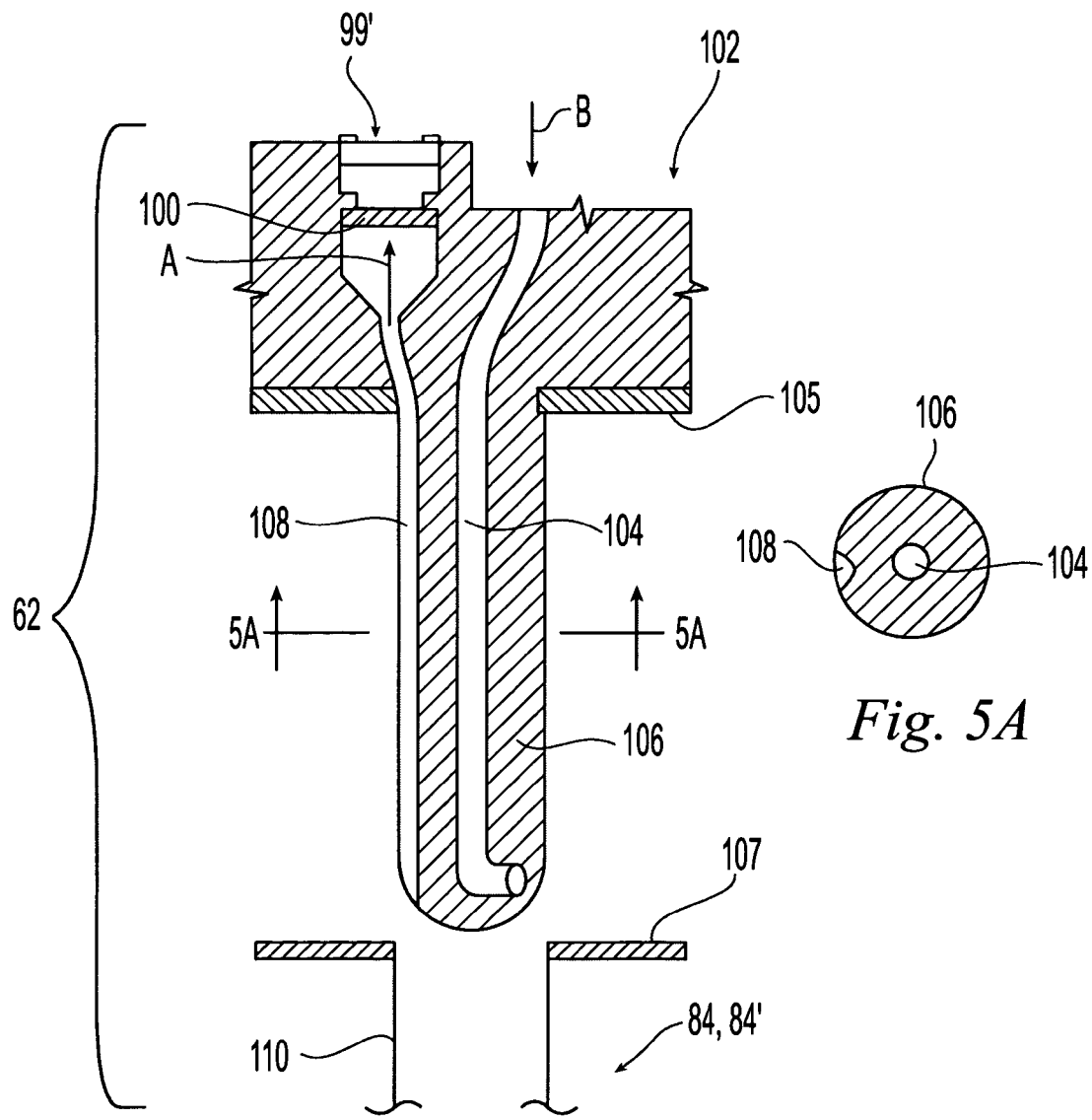
FIG. 5 is an enlarged, exploded, cross-sectional view of an alternative embodiment of a gas vent valve with a byproducts inlet channel and a gas outlet channel.
FIG. 5A is a cross-sectional view of a portion of the valve of FIG. 5 along line 5A-5A.

Another embodiment of venting valve 62 is shown in FIGS. 5 and 5A. Venting valve 62 comprises either female valve component 84 or 84' (as shown in FIGS. 4A and 4B, respectively) mounted to cartridge 40, and male valve component 102 mounted to the fuel cell, electronic device or refilling device.

Valve component 102 comprises two channels. First channel 104 is positioned within body 106 of valve component 102 and is adapted to transport gas and liquid byproducts, e.g., $CO_2$ and water in a direct methanol fuel cell, to cartridge 40 for storage. The gas and liquid byproducts flowable through 104 are illustrated by arrow B. Second channel 108 can be an open channel on the surface of body 106. Alternatively, channel 108 can also be positioned within body 106 or can be concentric to channel 104. Channel 108 is adapted to vent gas out of cartridge 40 through the fuel cell or electronic device and to the atmosphere. Open channel 108 forms a closed flow channel with inner surface 110 of the female valve component 84' or 84'. A seal formed by sealing surfaces 105 and 107 is established when male valve component 102 is fully inserted into female valve component 84 or 84'. Preferably, vent gas, illustrated by arrow A, passes through gas permeable, liquid impermeable membrane 100 to ensure that only gas is vented. Additionally, another check valve 99' like check valve 99 (shown in FIG. 4A) can be positioned downstream (or upstream) of membrane 100 to regulate the flow of vent gas, since check valve 99' can be set to open at any predetermined pressure. Additionally, fuel absorbent material 102 can be placed in flow path A to absorb fuel vapor. Preferably, the fuel absorbent material is placed proximate to membrane 100 to minimize the venting of fuel vapor.

Another embodiment of venting valve 62 is illustrated in FIGS. 6A and 6B. Vent nozzle 86 described above in connection with FIG. 4A is sized and dimensioned to open venting valve component 120. Valve component 120 functions similar to check valve 99 described above in connection with FIGS. 4A and 4B. Valve component 120 has an elastomeric or rubber spring or seal 122, which is configured and dimensioned to be biased between stop 123 and sealing surface 124 to form an internal seal. Gas byproduct cannot flow past sealing surface 124 when spring 122 abuts sealing surface 124. Hence, spring 122 functions both as the biasing member and as the sealing member.

As shown in FIG. 6A, when hollow pushrod or needle 92 penetrates neck 126, pushrod 92 may form a seal with neck 126 before the seal in valve component 120 is opened. As pushrod 92 acts on spring 122, spring 122 is compressed against stop 123, thereby moving spring 122 out of contact with sealing surface 124, as shown in FIG. 6B. As a result, the internal seal in valve component 120 is opened. A fluid flow path, shown by arrow A in FIG. 6B, is opened to allow the gas byproduct to vent from cartridge 40 to vent nozzle 86. Stop 123 includes one or more openings 123a to allow fluid to flow through stop 123. Openings 123a can be located on stop 123 and/or on spring 122. Hollow pushrod 92 has at least one side opening 127 to form a part of the fluid flow path. As discussed above, vent nozzle 86 may have gas permeable, liquid impermeable membrane 100 and/or check valve 99 to ensure that only gas byproduct is vented.

Figure 7:
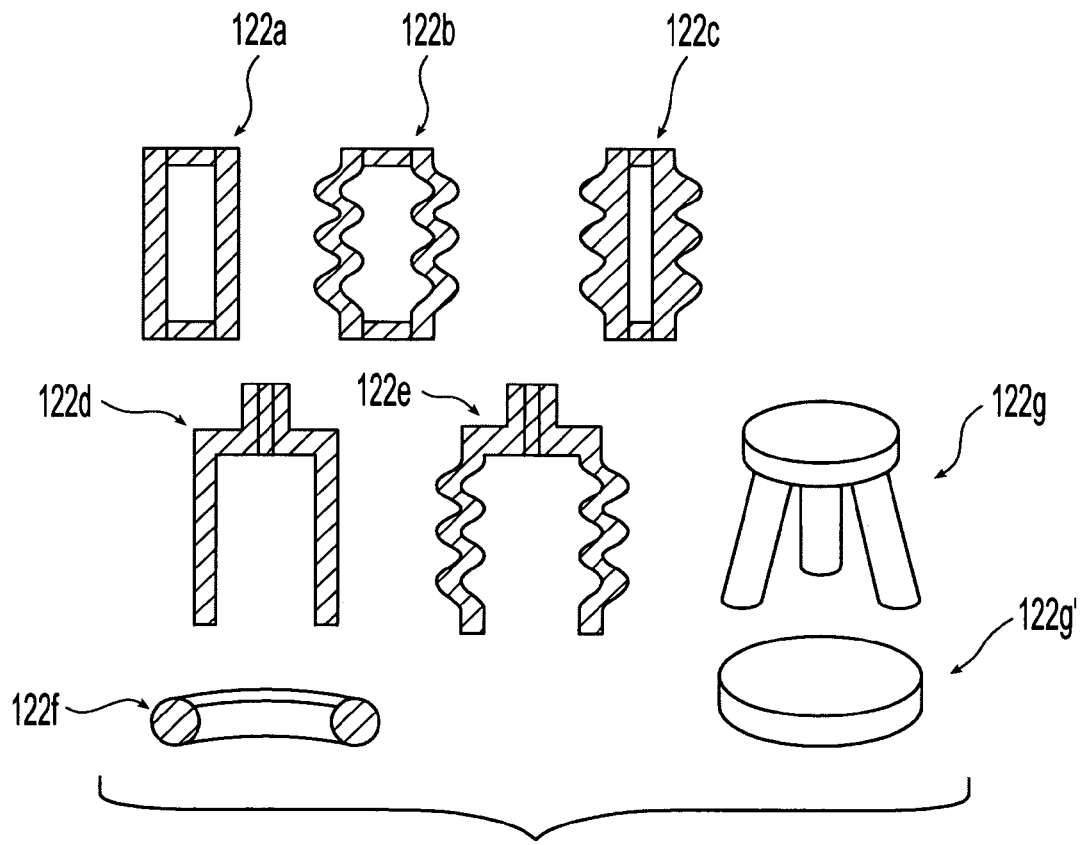
FIG. 7 shows cross-sectional views and a perspective view of exemplary embodiments of the elastomeric rubber spring of the vent valve of FIGS. 6A and 6B.

Spring 122 is illustrated as being solid in FIGS. 6A and 6B. FIG. 7 shows other exemplary configurations of spring 122. Spring 122 can also be hollow and have constant thickness and straight sidewalls like spring 122a. Alternatively, spring 122 can be hollow and have non-uniform thickness and non-linear sidewalls like springs 122b-c. This aids in controlling the compression or bucking of such springs. Additionally, the sidewall of spring 122 can be perforated to form a part of a flow path through valve component 120. Spring 122 can also have an opening at one end and a constant thickness and straight sidewalls like spring 122d or non-uniform and non-linear sidewalls like spring 122e. Spring 122 can also be formed as an O-ring like spring 122f. Alternatively, spring 122 can be a generally open shape with three legs downwardly-extending from a top member like spring 122g. The legs may extend longitudinally, or diagonally relative to the longitudinal direction (as shown) to provide stability in the transverse radial direction. Spring 122g can be augmented with a bottom member 122g' contacting the free ends of the legs. Springs 122 and 122a-g are preferably made from elastomeric rubbers including Buna N Nitrile, other nitrile rubbers, ethylene propylene, neoprene, ethylene propylene diene methylene terpolymer (EPDM) rubber or Vitron® fluoroelastomer, depending on the fuel stored in the fuel supply.

In accordance with another aspect of the present invention, the embodiment of FIGS. 4A, 4B, 6A and 6B can be a control or shut-off valve connecting the fuel supply to the fuel cell for transporting fuel from the fuel supply to the fuel cell or refilling device. In these embodiments, membrane 100 is omitted so that liquid fuel can be transported through vent nozzle 86, but check valve 99 can remain to provide an internal seal in this valve component. Vent nozzle or valve component 86 can be connected to the fuel cell and valve component 84, 84', 120 can be connected to the fuel supply or vice versa. A pump (not shown) connectable to valve component 86 can be used to open the internal seal of check valve 99 after the internal seal of valve component 84, 84' or 120 is opened by pushrod 92.

In accordance to another aspect of the present invention, with reference to FIG. 6B, as one valve component withdraws from another valve component, e.g., valve components 86 and 120, a partial vacuum may develop at the interface. This partial vacuum can exert a pressure on the internal seals of valve components 86, 120. To lessen this pressure, one or more relieves, such as relief or beveled surface 130, shown in FIG. 6B, is provided to shorten the stroke of the valve component 86 and 120. This, in effect, reduces the distance that valve components 86, 120 have to travel, before the inter-component seal between valve components 86, 120 is released. Shorter stroke reduces the pressure exerted on the internal seals in valve components 86, 120 during withdrawal. The stroke can also be shortened by longitudinal grooves 131 along the external surface of pushrod 92 (See FIG. 6C). Referring to FIGS. 6B, 6C and 6D, grooves 131 would extend from the tip of pushrod 92 to below neck 126. When pushrod 92 is withdrawn and grooves 131 pass neck 126, the partial vacuum is broken. Alternatively, neck 126 is in communication with ambient air through channel 132 so that the partial vacuum that would develop during withdrawal and insertion is minimized. Preferably, channel 132 includes or is covered by a gas permeable, liquid impermeable membrane similar to membrane 64 (in FIG. 1) or membrane 100 (in FIG. 6B) so that only air or other gases are allowed to enter or leave channel 132. Additionally, a lid 134 could be provided to seal channel 132 except when a fuel supply is inserted or withdrawn from the fuel cell. Relief surface 130, channel 132, and cover 134 are suitable for any valve components described herein and described in parent application Ser. No. 10/629,006.

Another embodiment of connecting valve 336 in accordance with one aspect of the present invention is shown in FIGS. 8A-8C. Connecting valve 336 comprises first valve component 340 and second valve component 342. First valve component 340 or second valve component 342 can be mated to cartridge 40 (in FIG. 1) or to a fuel cell or a fuel refilling device. In this configuration, first valve component 340 is coupled to cartridge 40 and second valve component 342 is connected to the fuel cell or refilling device. First valve component 340 comprises outer housing 344 integrally formed with a sleeve 346. Outer housing 344 defines rear opening 348 in fluid communication with inner chamber 349. Sleeve 346 defines front opening 350 that may be in fluid communication with chamber 349 when component 340 is in an open state, as discussed below. Component 340 further includes inner and outer O-rings 352 and 354. Inner O-ring 352 is located between a first side of radially-extending wall 346a and plunger 356. Inner O-ring 352 provides an inner seal within valve component 340. Outer O-ring 354 is located on the other side of sleeve wall 346a external to inner chamber 349. Outer O-ring 354 provides an intercomponent seal between valve components 340 and 342. Plunger 356 is movable in longitudinal direction L with respect to sleeve 346 within valve component 340. Plunger 356 is also biased by spring 358 against inner o-ring 352 to prevent fuel F from flowing from inner chamber 349 through gap "g" out of opening 350. As discussed in the parent application, the inter-component seal should form at least before the inner seals open to create a fluid flow path through the valve.

Second valve component 342 comprises outer housing 360 integrally formed with sleeve 362. Outer housing 360 defines a front opening 364 in fluid communication with chamber 366 within sleeve 362. Outer housing 360 further includes radially extending wall 360a with inner sealing surface 368 (best shown in FIG. 8C) and a plurality of outwardly extending ribs 370. Ribs 370 are circumferentially spaced apart to define recesses or gaps 372, as best shown in FIG. 9A, to allow fluid flow therebetween. Ribs 370 and gaps 372 can also be defined on valve component 340, e.g., on the mating outer surface of plunger 356. Alternatively, radially extending wall 360a includes at least one rib 370a with at least one recess or gap 372, as shown in FIG. 9B. Alternatively as shown in FIG. 9C, in place of ribs 370, 370a and gaps 372, plunger 356 can have a flow channel 357 defined at its outer end (adjacent component 342) to allow fuel to flow from valve component 340 through channel 357 to valve component 342. The channel 357 is located on a surface of plunger 356 opposite corresponding valve component 342. An inner seal in second component 342 is formed by ball 374 biased by spring 376 against sealing surface 368. Second valve component 342 further includes and end cap 378 over the end of sleeve 362 to further enclose and define chamber 366. End cap 378 includes a plurality of openings 380 for allowing fuel flow, as discussed below.

As shown in FIG. 8B when valve components 340 and 342 approach each other for connection, outer housing 360 is received within outer housing 344 and ribs 370 contact the end of plunger 356 protruding through opening 350. In addition, the outer surface of radial wall 360a forms an intercomponent seal with outer O-ring 354 before fuel can flow between valve components 340, 342. Preferably, this embodiment has a short stroke, i.e., valve components 340, 342 do not have to move far relative to each other to be in a position to allow fuel flow. As second component 342 moves further toward first component 340, plunger 356 compresses spring 358, which opens a path for fuel flow F from opening 348 through chamber 349, gap "g", opening 350, and openings 372 between ribs 370 (see FIG. 9A) or through channel 357 (see FIG. 9B). However, ball 374 prevents flow into second component 342 and fuel cell or refilling device.

When pump within fuel cell or fuel refilling device is turned on as shown in FIG. 8C, a pressure created by pump draws ball 374 away from sealing surface 368 and allows fuel flow F through opening 364, chamber 366 and openings 380 and into fuel cell or refilling device. When pump is turned off, spring 376 biases ball 374 into contact with sealing surface 368 to close fuel flow to the fuel cell or refilling device. When second component 342 is removed from first component 340, spring 358 biases plunger 356 into contact with O-ring 352 to prevent fuel flow to opening 350 (as shown in FIG. 8A), before fuel can flow between components 340, 342.

Preferably, outer housings 344, 360 and associated sleeves 346, 362 are formed of a molded plastic to reduce the number of parts forming valve 336. Preferably, housings 344, 360 and sleeves 346, 362 are formed by injection molding, compression molding, blow molding, extrusion, or thermal forming.

Each valve component may further include an absorbent or retention material 209 at their free ends. Absorbent material 209 can be located at exposed leading sealing faces of valve components 340, 342, as shown in FIG. 8A. Absorbent material 209 can absorb and retain fuel that remains in valve 336 or at the interface of valve components 340, 342, when fuel cartridge 40 is disconnected from the fuel cell or refilling device. In the present embodiment, both valve components 340 and 342 include absorbent material. In an alternative embodiment, only one valve component has absorbent material 209. Suitable absorbent material 209 includes, but is not limited to, hydrophilic fibers, such as those used in infant diapers and swellable gels, such as those used in highlighters/markers, sanitary napkins or a combination thereof. Additionally, absorbent material 209 can contain additive(s) that mix with the fuel. The selected absorbent material 209 can be compressed when valve components 340, 342 are connected, and can be uncompressed when valve components 340, 342 are disconnected. Absorbent material 209 can also be uncompressed, when valve components 340, 342 are connected.

Additionally, as disclosed in the '006 parent application for shipping and storage, a fuel cartridge with one of the valve components 340 or 342 can be covered at the opening of the valve component with a cap or a film or both, which is removed before the cartridge is connected to the fuel cell or a refilling device. The cap can be a two-part cap and the two parts are connected but are readily separable, e.g., the two parts are connectable by perforations. Once the cap is removed from the cartridge, one part of the cap remains on the cartridge to indicate that the cartridge was opened. The film can also be made from two readily separable parts.

Figures 13, 14:
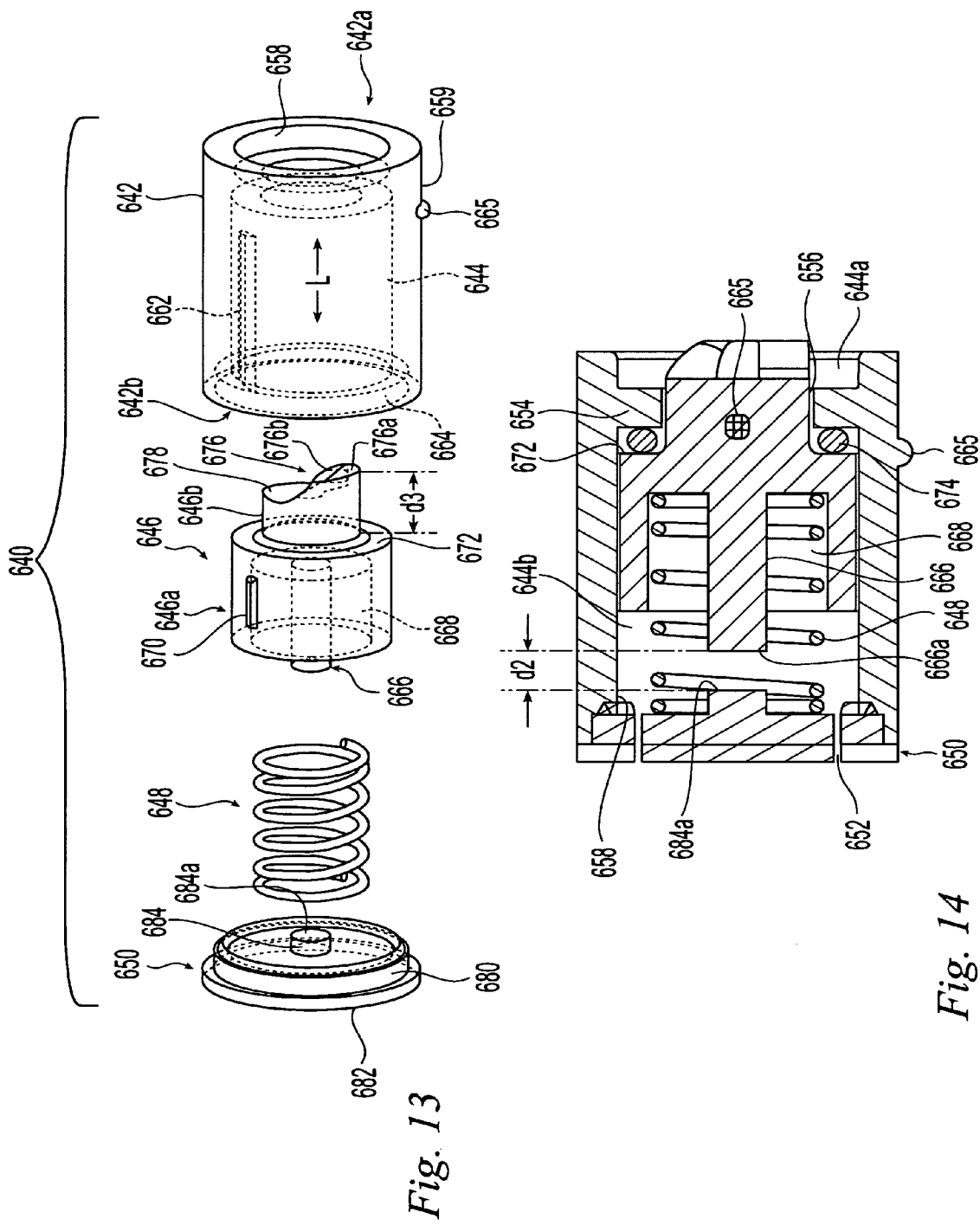
FIG. 13 is an exploded, perspective view of a second connecting valve component according to another aspect of the present invention suitable for use with the first valve component of FIG. 10.
FIG. 14 is an enlarged, cross-sectional view of the component of FIG. 13 in an assembled state with a plunger at an initial position.
Figure 17A:
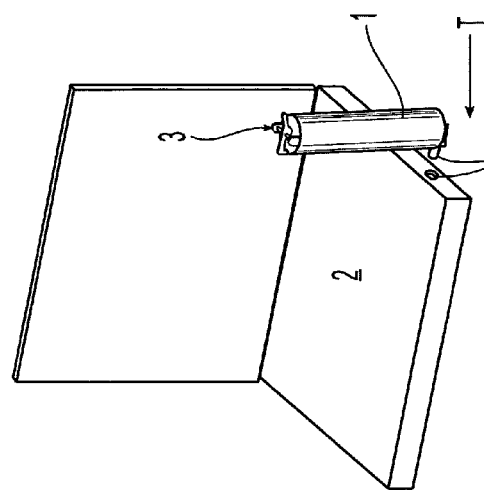
FIGS. 17A-17D illustrate a fuel supply equipped with a valve component of FIGS. 10-14, 15A-15D and 16 being inserted into an exemplary electronic host device.

FIG. 10 illustrates another embodiment of first valve component 540 forming connecting valve, designated as V (See FIG. 15A) with second valve component 640, shown in FIG. 13. First valve component 540 can be mated to cartridge 40 or to the fuel cell, the refilling device or the electronic device as illustrated in FIG. 17A.

First valve component 540 comprises a main housing 542 that defines stepped chamber 544. Plunger 546, spring 548, and portions of end cap 550 are received within chamber 544. Plunger 546 is movable in longitudinal direction L within chamber 544 with respect to main housing 542. End cap 550, however, is removably or irremovably fixed to main housing 542. In one preferred embodiment, end cap 550 can be snap fitted or ultrasonically welded to main housing 542. Alternatively, these components can be joined by adhesive bonding, ultrasonic bonding, welding, spin welding, radio frequency welding, heat sealing, or the like. End cap 550 defines a plurality of openings 552, as shown in FIG. 11, for fuel to flow therethrough.

Referring to FIGS. 10 and 11, main housing 542 further includes radially-inwardly extending wall 554 that divides chamber 544 into external chamber portion 544a and internal chamber portion 544b. Wall 554 includes opening 556 to allow fluid communication between the external and internal chamber portions 544a, b. External O-ring 536 is located on exterior side of radial wall 554.

Inner surface 558 of main housing 542 near first end 542a includes groove 560 (shown in phantom) with longitudinally extending section 560a (shown in phantom) and circumferentially extending section 560b (shown in phantom). Preferably, the angle Θ between section 560a and first portion of section 560b, as shown in FIG. 11, is about 90°. In an alternative embodiment, as shown in FIG. 11A, the angle Θ between section 560a and first portion of section 560b' is greater than about 90°. The advantage of the configuration of FIG. 11A will be discussed below.

Inner surface 558 of main housing 542 near second end 542b includes longitudinally extending groove 562 (shown in phantom). Main housing 542 near second end 542b further includes circumferentially extending recess 564 (shown in phantom).

Figure 12:
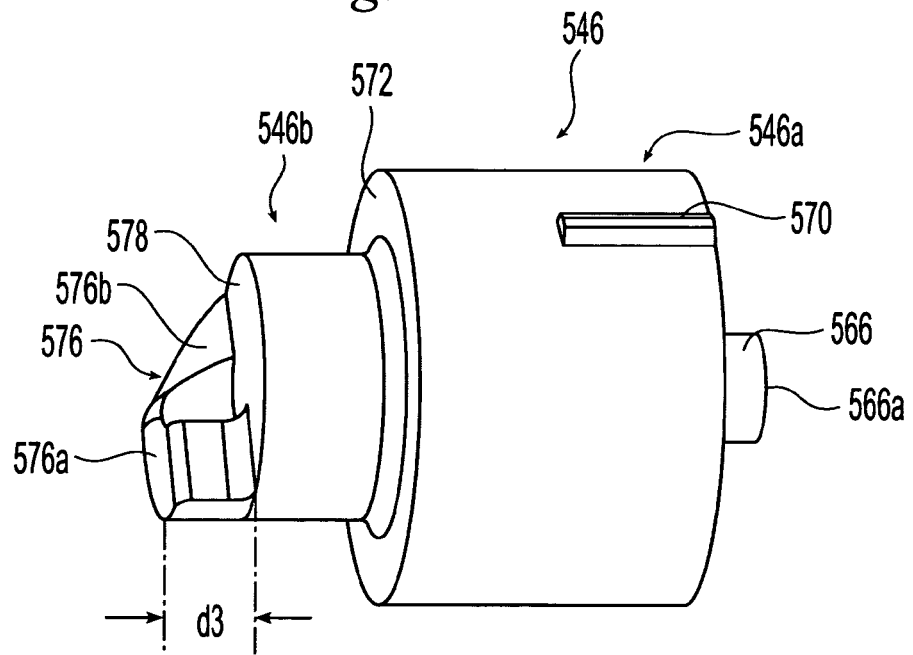
FIG. 12 is an enlarged, perspective view of the plunger of component of FIG. 10.

With reference to FIGS. 10-12, plunger 546 includes enlarged diameter portion 546a and reduced diameter portion 546b. Enlarged portion 546a includes longitudinally extending rod 566 circumferentially surrounded by chamber 568. Rod 566 includes free end 566a. The outer surface of enlarged diameter portion 546*a* includes longitudinally extending projection rib 570. Radially extending surface 572 of enlarged portion 546*a* receives inner O-ring 574.

Reduced diameter portion 546*b* includes cam surface 576 projecting from surface 578. The distance between free end 576*a* of cam surface 576 and surface 578 is designated d3. Cam surface 576 further includes ramped portion 576*b*. With reference to FIG. 10, end cap 550 includes outer ring 580 projecting from wall 582. End cap 550 further includes rod 584 projecting from wall 582 and centrally spaced from and coaxially aligned with ring 580. Rod 584 includes free end 584*a*.

With reference to FIGS. 10-12 when plunger 546 is placed in main housing 542, rib 570 of plunger 546 is received in groove 562 of main housing 542 to assure proper alignment of plunger 546 with main housing 542. Enlarged diameter portion 546*a* of plunger 546 is received in inner chamber portion 544*b* of main housing 542 and reduced diameter portion 546*b* of plunger 546 extends through opening 556. Next, spring 548 is installed within plunger inner chamber 568 surrounding rod 566. Then, end cap 550 is connected to main housing 542 so that spring 548 also surrounds end cap rod 584 and such that ring 580 is received in recess 564 of main housing 542.

The parts of valve component 540 are configured such that in an initial or seal position, spring 548 biases plunger 546 and consequently inner O-ring 574 into sealing engagement with radial wall 554. Also in the initial or seal position, plunger 546 is spaced from end cap 550 so that distance d1 extends between plunger rod free end 566*a* and end cap rod free end 584*a*.

With reference to FIG. 13, second valve component 640 comprises main housing 642 that defines chamber 644. Plunger 646, spring 648, and portions of end cap 650 are received within chamber 644. Plunger 646 is movable in longitudinal direction L within chamber 644 with respect to housing 642. End cap 650, however, is removably or irremovably fixed to housing 642. In one preferred embodiment, end cap 650 is ultrasonically welded to main housing 642. Alternatively, these components can be joined by adhesive bonding, ultrasonic bonding, snap fitting, welding, radio frequency welding, heat sealing, or the like. End cap 650 defines a plurality of openings 652, as shown in FIG. 14, for fuel to pass through.

Referring to FIGS. 13-14, main housing 642 further includes radially-inwardly extending wall 654 that divides chamber 644 into external chamber portion 644*a* and internal chamber portion 644*b*. Wall 654 includes opening 656 to allow fluid communication between external and internal chamber portions 644*a*, *b*. Housing 642 further includes inner surface 658 and first end 642*a*. Inner surface 658 of main housing 642 near second end 642*b* includes longitudinally extending groove 662 (shown in phantom). The interior of main housing 642 near second end 642*b* further includes circumferentially extending recess 664 (shown in phantom). Projecting pin 665 extends from outer surface 659 of main housing 642. More than one pin 665 and corresponding groove 560 may be present.

Plunger 646 is similar to plunger 546 and includes enlarged diameter portion 646*a* and narrow diameter portion 646*b*. Enlarged diameter portion 646*a* includes longitudinally extending rod 666 circumferentially surrounded by internal chamber 668. Rod 666 includes free end 666*a*. The outer surface of enlarged diameter portion 646*a* includes longitudinally extending projection rib 670. Radially extending surface 672 of enlarged portion 646*a* receives inner O-ring 674.

Reduced diameter portion 646*b* includes cam surface 676 projecting from surface 678. The distance between free end 676*a* of cam surface 676 and surface 678 is designated d3. Cam surface 676 further includes ramped portion 676*b*. With reference to FIG. 13, end cap 650 includes outer ring 680 projecting from wall 682. End cap 650 further includes rod 684 projecting from wall 682 and centrally spaced from and coaxially aligned with ring 680. Rod 684 includes free end 684*a*.

When plunger 646 is inside main housing 642, rib 670 is received in groove 662 to assure proper alignment of plunger 646 with main housing 642. Enlarged portion 646*a* of plunger 646 is received in inner chamber portion 644*b* of main housing 642 and reduced diameter portion 646*b* of plunger 646 extends through opening 656. Next, spring 648 is inserted within plunger inner chamber 668 surrounding rod 666. Then, end cap 650 is connected to main housing 642 so that spring 648 also surrounds end cap rod 684 and such that ring 680 is received in recess 664 of main housing 642.

With reference to FIG. 14, the parts of valve component 640 are configured such that in an initial position, spring 648 biases plunger 646 and consequently O-ring 674 into sealing engagement with radial wall 654. Also in the initial or sealed position, plunger 646 is spaced from end cap 650 so that distance d2 exists between plunger rod free end 666*a* and end cap rod free end 684*a*.

Figure 15A:
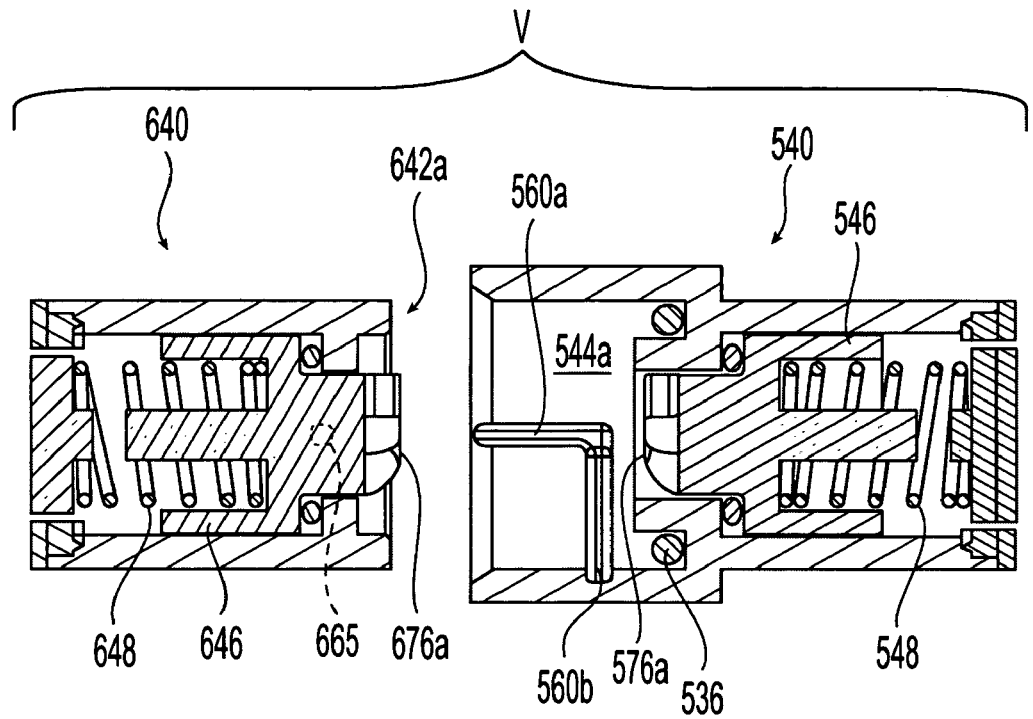
FIG. 15A is an enlarged, cross-sectional view of the first and second valve components of FIGS. 10 and 13, wherein the components are unconnected and out of contact.

Referring to FIGS. 11, 14 and 15A, operation of the valve V will now be discussed. As shown below, valve component 640 is attached to the fuel cell or the device, while valve component 540 is attached to the cartridge. However, the arrangement can also be reversed. The following table summarizes the operation of valve V:

| Step | Relative Movement of Housing 542 to Housing 642 | Valve Component 640 on Device | Valve Component 540 on Cartridge |
| --- | --- | --- | --- |
| 1 | Longitudinal | Closed | Closed |
| 2 | Partial Rotational | Closed | Closed |
| 3 | Partial Rotational | Open | Closed |
| 4 | Partial Rotational | Open | Open |

Figure 15B:
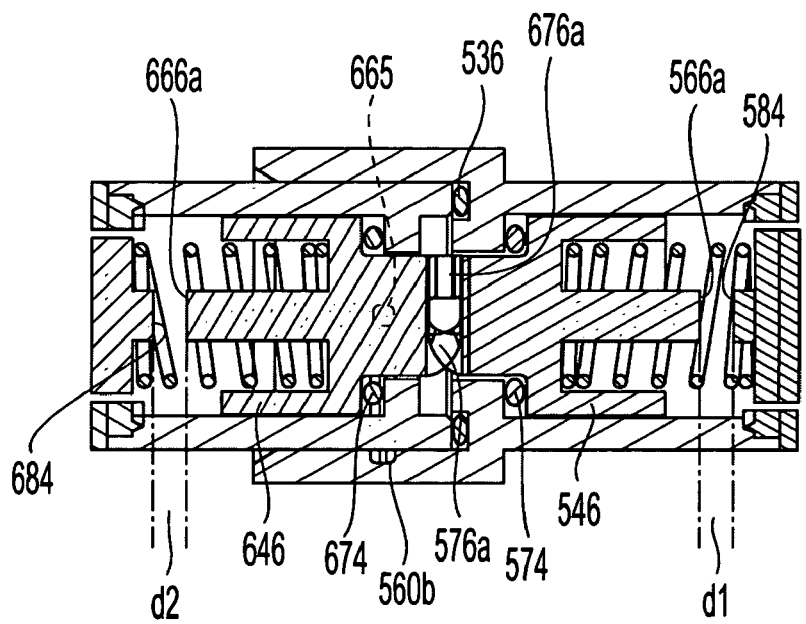
FIG. 15B is an enlarged, cross-sectional view of the valve components of FIG. 15A, wherein the components are connected and the plungers are in initial positions.
Figure 15C:
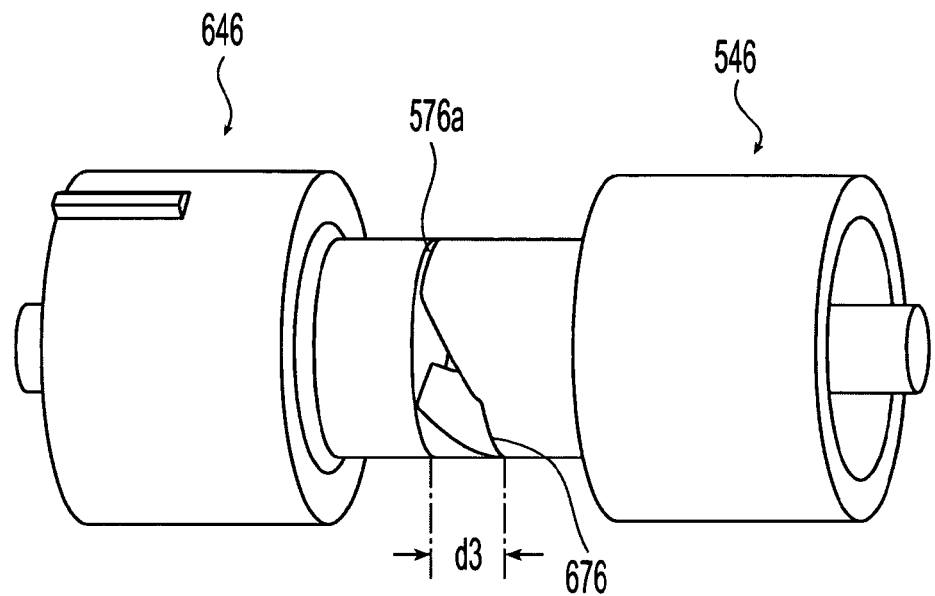
FIG. 15C is an enlarged, perspective view of the plungers of the valve components of FIG. 15B, wherein the plungers are in initial positions.

The table above will now be discussed in detail. When valve components 540 and 640 approach each other for connection (See FIG. 15A), external chamber portion 544*a* receives first end 642*a* of component 640 so that a portion of component 640 is received by component 540. End 642*a* of component 640 contacts external O-ring 536 to form an intercomponent seal. To assure proper alignment of components 540 and 640, pin 665 on valve component 640 is received into groove portion 560*a* of valve component 540. When pin 665 reaches the end of groove portion 560*a*, cam surface free ends 576*a* and 676*a* are out of contact and side-by-side, as best seen in FIG. 15C. This is the longitudinal insertion movement of step 1. Distances d1 and d2 have not changed during insertion and plungers 546 and 646 are in their initial or seal positions, as shown in FIG. 15B. As a result, at the end of the longitudinal insertion movement of valve component 640, valve component 640 and valve component 540 are closed, since the seals at internal O-rings 574 and 674 prevent fuel flow between components 540 and 640.

Figure 15D:
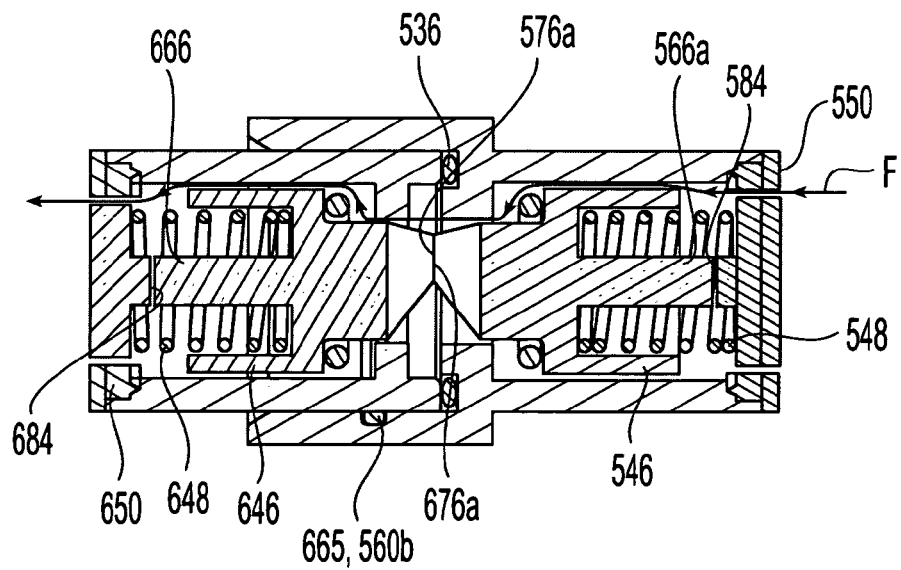
FIG. 15D is an enlarged, cross-sectional view of the valve components of FIG. 15B, wherein the components are connected and the plungers are in final positions to allow fuel flow.

Referring to FIGS. 10, 13, 15D, during step 2, main housing 642 is partially rotated so that pin 665 moves along circumferential groove portion 560*b* until the two cam surfaces 576 and 676 contact each other. Furthermore, o-ring 536 is compressed to establish an inter-component seal between valve components 540 and 640.

In step 3, spring 648 in one embodiment is designed to be weaker than spring 548 so that as component 640 rotates, cam surface ramped portions 576*b* and 676*b* contact and allow only plunger 646 biased by weaker spring 648 to move toward end cap 650 decreasing distance d2 while d1 remains substantially unchanged. This rotational movement causes the seal at internal O-ring 674 to open, but the seal at internal O-ring 574 remains closed. During this step, d2 approaches zero and pin 665 of second component 640 has not reached the end of groove portion 560*b*.

In step 4, main housing 642 is further rotated so that plunger 646 reaches the end of groove portion 560*b*, this further movement overcomes the spring 548 so that plunger 546 moves and decreases distance d1. This further rotational movement causes the seal at internal O-ring 574 to open, and this allows fuel flow F between the components 540 and 640 (as shown in FIG. 15D). The components 540, 640 and distances d1, d2, and d3 are configured and dimensioned so that the above discussed operational sequence occurs.

When main housing 642 is rotated in the opposite direction then removed from valve component 540, the sequence is reversed so that plunger 546 returns to its initial position with the aid of spring 548 to close valve component 540 before plunger 646 returns to its initial position with the aid of spring 648 to close valve 640. With reference to FIG. 11A, increasing the angle Θ between groove sections 560*a,b* to greater than 90° allows plunger 646 to exert increased force on external O-ring 536 during steps 2-4.

With reference to FIGS. 14 and 15A-D, in an alternative embodiment of valve component 640, internal O-ring 674 can be formed of a material that expands and continues to seal component 640 when plunger 646 moves decreasing distance d2. Exemplary O-rings are also shown in FIG. 7. In this alternative embodiment, the sequence of operation is shown in the table below:

| Step | Relative Movement of Housing 542 to Housing 642 | Valve Component 640 on Device | Valve Component 540 on Cartridge |
|---|---|---|---|
| 1 | Longitudinal | Closed | Closed |
| 2 | Partial Rotational | Closed | Closed |
| 3 | Partial Rotational | Closed | Closed |
| 4 | Partial Rotational | Open | Open |

In such an embodiment, spring 648 is weaker than spring 548 and valve component 540 operates as discussed above. Valve component 640, however, in steps 2 and 3 has O-ring 674 that expands and continues to seal until main housing 642 is rotated to the point where distance d2 is zero. At this point, expanding O-ring 674 no longer seals component 640 and further rotation of main housing 642 moves plunger 546 against 548 reducing distance d1 and opening flow path through valve components 540 and 640.

When the sequence is reversed, plunger 546 returns to its initial position with the aid of spring 548 to close valve component 540 before plunger 646 returns to its initial position with the aid of spring 648 to close valve 640.

With reference to FIGS. 16 and 15A-D, in yet another embodiment valve component 1640 can be formed without spring 648 and internal O-ring 674 (See FIG. 13) and so that distance d2 is zero. Consequently, plunger 646 cannot move and valve component 1640 is permanently open. In this alternative embodiment, the sequence of operation is shown in the table below:

| Step | Relative Movement of Housing 542 to Housing 642 | Valve Component 1640 on Device | Valve Component 540 on Cartridge |
|---|---|---|---|
| 1 | Longitudinal | Open | Closed |
| 2 | Partial Rotational | Open | Closed |
| 3 | Partial Rotational | Open | Open |

In such an embodiment, valve component 1640 is permanently open in steps 1-4. When pin 665 reaches the end of groove 560*b* as previously discussed, valve component 540 moves from the closed state to the open state to allow fuel flow between components 540 and 1640.

When the sequence is reversed, plunger 546 returns to its initial position with the aid of spring 548 to close valve component 540.

With reference again to FIGS. 13, 10 and 15A-D, in yet another embodiment similar to valve component 640, except that this alternate valve component can be formed without rib 670 and without pin 665. In other words, in valve component 640, plunger 646 is movable longitudinally and rotationally relative to main housing 642, while in valve component 540, plunger 546 is movable only longitudinally relative to main housing 542. This arrangement can also be reversed. Consequently, rotational movement of valve component 640 is not necessary to open valve V. Preferably, the O-rings used in this embodiment have sufficient thickness similar to the elastomeric springs illustrated in FIG. 7, and that the springs used provide torsional support to allow the plungers to return to their respective closing position upon disengagement. In this alternative embodiment, the sequence of operation is shown in the table below:

| Step | Relative Movement of Housing 542 to Housing 642 | Valve Component 640 on Device | Valve Component 540 on Cartridge |
|---|---|---|---|
| 1 | Longitudinal | Closed | Closed |
| 2 | Longitudinal | Open | Closed |
| 3 | Longitudinal | Open | Open |

In such an embodiment, spring 648 is weaker than spring 548 as previously discussed. Valve component 640 need only be moved longitudinally into valve component 540 to open valve V. During initial insertion of valve component 640 (step 1), spring 648 is overcome before spring 548 so that valve component 640 is opened, but valve component 540 remains closed through step 2. Due to cam surfaces 576, 676 and removal of rib 670 and groove 662 longitudinal motion of main housing 642 causes rotation of plunger 646 with respect to plunger 546 however spring 548 is not overcome until main housing 642 moves a predetermined distance. In step 3, relative movement of main housing 642 causes plunger 646 to move plunger 546 overcoming spring 548 until plunger 546 moves from the closed state to the open state to allow fuel flow between components 540 and 640. Thus, valve V can be converted from a 2-motion actuated valve (as shown in FIG. 15A) to a 1-motion actuated valve, as described above.

When the sequence is reversed, plunger 546 returns to its initial position with the aid of spring 548 to close valve component 540 before plunger 646 returns to its initial position with the aid of spring 648 to close valve 640. Although the above sequences are described with movement of main housing 642 all that is necessary is relative movement so alternatively main housing 542 can occur.

Figure 17B:
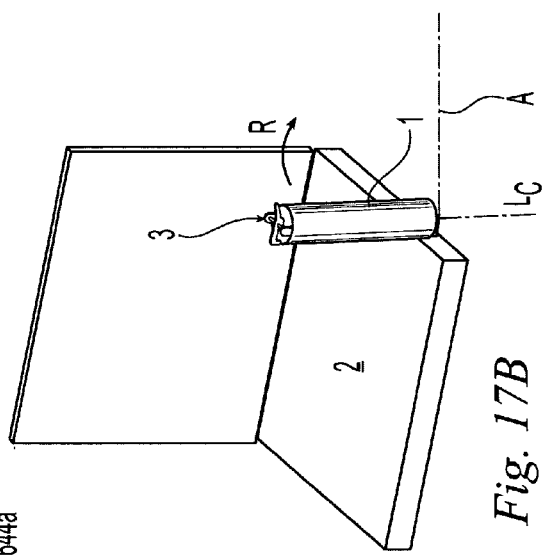
Figure 16:
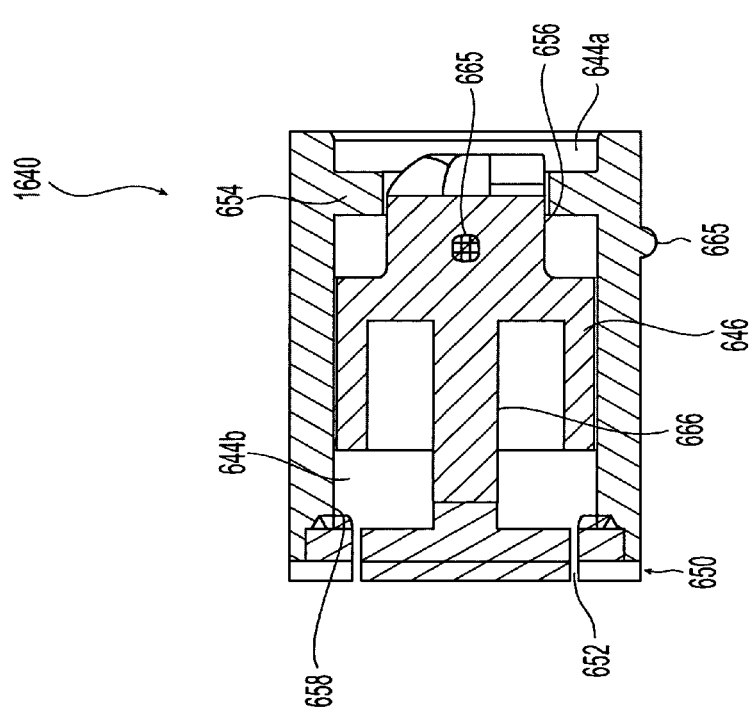
FIG. 16 is an enlarged, cross-sectional view of an alternative embodiment of the second valve component shown in FIG. 14.
Figure 17E:
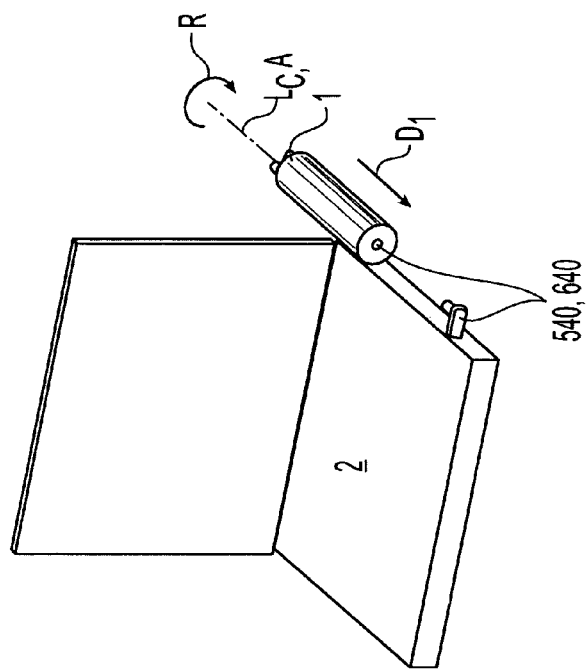
FIG. 17E illustrates an alternative embodiment of the fuel supply equipped with the valve component of FIGS. 10-14, 15A-15D and 16.
Figure 17C:
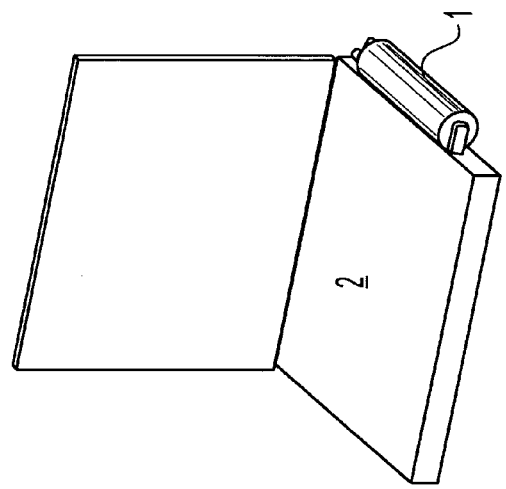
Figure 17D:
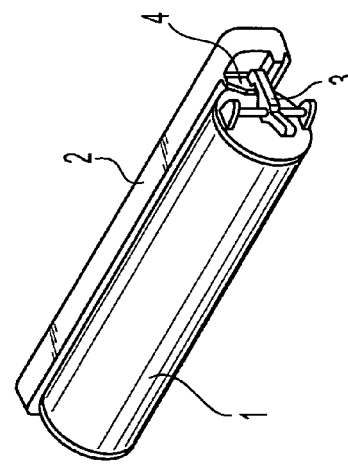

Referring to FIGS. 17A-17D, fuel supply 1 has one of valve component 540 or 640 and electronic host device 2 is equipped with matching valve component. First, fuel supply 1 is positioned relative to device 2 so that valve components 540 and 640 are aligned with each other (as shown in FIG. 17A). Then, fuel supply 1 and/or electronic device 2 are moved relative to each other along translational direction T so that valve components 540, 640 are inserted into each other. Thereafter, fuel supply 1 and device 2 are moved rotationally relative to each other in direction R about axis A so that cam surfaces 576, 676 (shown in FIGS. 11 and 13) in valve components 540, 640 act on each other to establish fluid communication between valve components 540 and 640. The fuel supply 1 is shown after rotation in direction R in FIGS. 17C and 17D. At this point, fuel can be pumped or otherwise transported from fuel supply 1 to a fuel cell inside device 2. While a translational movement and a rotational movement are illustrated in FIGS. 17A-17C, it will be noted that any combination of two or more movements can be employed to attach fuel supply 1 to electronic host device 2 or fuel cell. For example, two translational movements, two rotational movements or one translational and one rotational movement in any order can be used. Additionally, different locking and unlocking mechanisms for fuel supply 1 and electronic device 2 could be designed/implemented that require different components and operations or motions than those discussed herein to release fuel supply 1.

Optionally, fuel supply 1 can also have latch 3 located thereon, so that after fluid communication is established between valve components 540,640, latch 3 can mate with corresponding ledge 4 located on electronic host device 2 to hold fuel supply 1 in place. While latch 3 is illustrated to be rotationally mounted on fuel supply 1 and is hooked at one end to lock with ledge 4, latch 3 can have any configuration and can be connected or supported in any manner to fuel supply 1. For example, latch 3 can be an arm integrally connected to fuel supply 1, such that when a moment is applied to the arm the arm bends to lock with ledge 4.

In the alternative embodiment, shown in FIG. 17E, fuel supply 1 has one of valve component 540 or 640 and electronic host device 2 is equipped with matching valve component. First, fuel supply 1 is positioned relative to device 2 so that valve components 540 and 640 are aligned with each other. Then, fuel supply 1 and/or electronic device 2 are moved relative to each other along translational direction D1 so that valve components 540, 640 are inserted into each other. Thereafter, fuel supply 1 and device 2 are moved rotationally relative to each other in direction R about cartridge axis $L_c$ so that cam surfaces 576, 676 (shown in FIGS. 11 and 13) in valve components 540, 640 act on each other to establish fluid communication between valve components 540 and 640. At this point, fuel can be pumped or otherwise transported from fuel supply 1 to a fuel cell inside device 2.

As illustrated in FIG. 17B, cartridge axis $L_c$ is not co-axial with axis A, and preferably is substantially perpendicular to axis A. Alternatively, as illustrated in FIG. 17E, cartridge axis $L_c$ is co-axial with axis A.

While it is apparent that the illustrative embodiments of the invention disclosed herein fulfill the objectives stated above, it is appreciated that numerous modifications and other embodiments may be devised by those skilled in the art. For example, different types of springs can be used in conjunction with the valves disclosed herein. Additionally, the valves can be manually actuated or opened by the user or by user operated magnets. Moreover, a filter located upstream of the valves described above to keep particulate(s) or fibers out of the valves can be included. Suitable filters include, but are not limited to, hydrophilic micro-membranes having a pore size sufficient to keep particulates or other solid objects out of the valves, which are wettable by the fuel contained in the fuel supplies. Such filter can be used with any embodiments described herein and described in the parent application, which has already been incorporated by reference. For example, in the embodiment shown in FIGS. 6A-6B, this membrane can be located at holes 123*a*; in the embodiment shown in FIGS. 8A-8C, this membrane can be located at aperture 348, opening 364, or anywhere on flow path F preferably at or near the interface of the two valve components and in the embodiment shown in FIGS. 10-16, this membrane can be located at either holes 552 or 652, or both or anywhere in flow path F preferably at or near the interface 644*a* and 544*a* of the two valve components.

Additionally, in the embodiments described above one of the valve components may not have an internal seal, e.g., one valve component can be a flow conduit or a canula. Embodiments where one valve component does not need an internal seal include, but are not limited to, the valve employing fuel absorbent material 209, valve with particulate filters, or the valve component shown in FIG. 16, among others.

Therefore, it will be understood that the appended claims are intended to cover all such modifications and embodiments, which would come within the spirit and scope of the present invention.

We claim:

1. A valve adapted for use with a fuel supply and a fuel cell, said valve comprises:
   a vent nozzle positioned on a fuel cell or an electronic device, the vent nozzle comprising a first channel, wherein the vent nozzle is adapted to open a seal in a valve component positioned on the fuel supply so that a gas contained in the fuel supply is transported through the vent nozzle and vented from the fuel supply.

2. The valve of claim 1, wherein the valve component positioned on the fuel supply is a duckbill valve.

3. The valve of claim 1, wherein the valve component positioned on the fuel supply includes a check valve.

4. The valve of claim 1, wherein the valve component positioned on the fuel supply comprises an elastomeric member that biases against a sealing surface to form the seal, and upon compression of said elastomeric member by said vent nozzle said elastomeric member moves away from the sealing surface to open the seal.

5. The valve of claim 1, wherein the valve component positioned on the fuel supply is connected to a liner.

6. The valve of claim 1, wherein the first channel is in fluid communication with a gas permeable, liquid impermeable membrane positioned in the vent nozzle.

7. The valve of claim 1, wherein the first channel is further in fluid communication with a check valve positioned in the vent nozzle, wherein the check valve opens at a predetermined pressure to vent the gas.

8. The valve of claim 1, wherein the first channel is in communication with a fuel absorbent material.

9. The valve of claim 8, wherein the fuel absorbent material comprises charcoal.

10. The valve of claim 8, wherein the fuel absorbent material comprises a filler.

11. The valve of claim 1, wherein the gas is vented through the fuel cell or the electronic device to the atmosphere.

12. The valve of claim 1, wherein the vent nozzle further comprises a second channel.

13. The valve of claim 12, wherein byproducts from the fuel cell are transported through the second channel to the fuel supply.

14. A fuel cell system including a valve adapted for use with a fuel supply and a fuel cell, said valve comprising:
a first valve component having a first internal seal connectable to one of either a fuel supply or a fuel cell,
a second valve component having a second internal seal connectable to the other of either the fuel supply or the fuel cell,
wherein at least the first valve component comprises a housing and an elastic inner body, and wherein the elastic inner body cooperates with a sealing surface to form the first internal seal in said first valve component, and upon connection of the first valve component to the second valve component the elastic inner body is compressed to open the first internal seal to establish a fluid flow path through said first valve component.

15. The fuel cell system of claim 14, wherein during connection of the first valve component to the second valve component, an inter-component seal is formed at least before opening of the first internal seal.

16. The fuel cell system of claim 14, wherein the elastic inner body comprises straight, uniform thickness wall.

17. The fuel cell system of claim 14, wherein the elastic inner body comprises a non-linear sidewall.

18. The fuel cell system of claim 14, wherein the elastic inner body comprises non-uniform thickness wall.

19. A valve comprising:
a first valve component connectable to one of either a fuel supply or a fuel cell,
a second valve component connectable to the first valve component and connectable to the other of either the fuel supply or the fuel cell, such that a fluid flow path is established therebetween,
wherein at least one fluid absorbent member is disposed proximate to the first or second valve components.

20. The valve of claim 19, wherein the fluid absorbent member is located substantially between the interface between the first valve component and the second valve component.

21. The valve of claim 20, wherein the fluid absorbent member is located on the first valve component or on the second valve component.

22. The valve of claim 19, wherein at least one of the first valve component and the second valve component comprises an internal seal.

23. The valve of claim 19, wherein the fluid absorbent member comprises hydrophilic fibers or swellable gels, or a combination thereof.

24. The valve of claim 19, wherein the fluid absorbent member comprises charcoal.

25. The valve of claim 20, wherein the fluid absorbent member absorbs fluid discharged when the first valve component and the second valve component are connected to or disconnected from each other.

26. A valve comprising:
a first valve component and a second valve component connectable to the first valve component such that a fluid flow path is established through the two valve components, wherein at least one rib is positioned between the first and second valve components and wherein a gap is provided through said at least one rib, and said fluid flow path includes fluid flow through said gap.

27. The valve of claim 26, wherein said rib is disposed on a surface of the first valve component, said surface is oriented opposite to the second valve component.

28. The valve of claim 26, wherein said rib is disposed on a surface of the second valve component, said surface is oriented opposite to the first valve component.

29. A valve adapted for use with a fuel supply and a fuel cell comprising
a first valve component and a corresponding second valve component connectable to the first valve component such that a fluid flow path is established through the two valve components, wherein the fluid flow path includes a channel defined on a surface of a plunger located in the first or second valve component and wherein said surface is located opposite to the corresponding valve component.

30. A valve comprising
a first valve component and a second valve component connectable to the first valve component such that a flow path is established through the first and second valve components, wherein a housing of the first valve component and a housing of the second valve component are movable in at least two directions relative to each other to establish said flow path.

31. The valve of claim 30, wherein the housing of the first valve component is movable in the at least two directions relative to the second valve component to establish the flow path.

32. The valve of claim 30, wherein the housing of the second valve component is movable in the at least two directions relative to the first valve component to establish the flow path.

33. The valve of claim 30, wherein at least one of the first valve component and the second valve component is connectable to a fuel supply for a fuel cell.

34. The valve of claim 33, wherein the other one of the first valve component and the second valve component is connectable to a device comprising the fuel cell.

35. The valve of claim 30, wherein the first valve component is connectable to one of either a fuel supply or an electronic device, and the second valve component is connectable to the other of either a fuel supply or an electronic device.

36. The valve of claim 35, wherein one of the housings comprises a channel and the other housing comprises a protrusion sized and dimensioned to be received in the channel, such that the channel and protrusion guide the relative movement of the housings.

37. The valve of claim 36, wherein the channel comprises at least two segments.

38. The valve of claim 37, wherein the two segments from an angle of about 90°.

39. The valve of claim 37, wherein the two segments form an angle greater than about 90°.

40. The valve of claim 35, wherein at least one of the valve components has a plunger that is confined to move in a translational direction.

41. A valve adapted for use with a fuel supply and a fuel cell comprising
a first component and
a second component having an internal seal, wherein the internal seal is provided between an outer housing and an integral inner body and the inner body is movable translationally and rotationally relative the outer housing to open the internal seal to allow the transport of fluid from the second component to the first component.

42. The valve of claim 41, wherein the inner body of the second component acts on a first ram surface of the first component to cause rotation of the inner body.

43. The valve of claim 42, wherein the inner body of the second component comprises a second ram surface that acts on the first ram surface.

44. The valve of claim 41, wherein the first component further comprises an internal seal.

45. A fuel cell system having a valve, said valve comprising:
- a first valve component
- a second valve component connectable to the first valve component such that a fluid flow path is established therebetween,
- wherein the valve further comprises a filter located at a position upstream of said fluid flow path to keep non-fuel objects from entering the fluid flow path, and
- wherein the first valve component is connectable to one of either a fuel supply or a fuel cell, and the second valve component is connectable to the other of either a fuel supply or a fuel cell.

46. The fuel cell system of claim 45, wherein at least one of the valve components comprises an internal seal.

47. The fuel cell system of claim 45, wherein the filter comprises a membrane wettable by a fuel.

48. A fuel supply comprising a fuel reservoir containing fuel cell fuel and a valve component having an internal seal, wherein when the internal seal is closed the fuel reservoir is sealed and wherein the valve component is in fluid communication with the fuel reservoir when the internal seal is open, and wherein the valve component is initially covered by a covering member and the covering member is removed before the fuel supply is connected to a fuel cell.

49. The fuel supply of claim 48, wherein the covering member comprises a cap.

50. The fuel supply of claim 48, wherein the covering member comprises a film.

51. The fuel supply of claim 48, wherein the covering member comprises at least two separable parts, wherein after the covering member is removed one part remains on the fuel supply.

52. A fuel supply comprising a fuel reservoir, an absorbent member capable of absorbing fuel and a valve component having an internal seal, wherein the valve component is in fluid communication with the fuel reservoir when the internal seal is open, and wherein the absorbent member is located proximate to the valve component, wherein the absorbent member is adapted to absorb dischargeable fuel when the fuel supply is connected to or disconnected from a device that consumes the fuel.

53. The fuel supply of claim 52, wherein the absorbent member comprises hydrophilic fibers or swellable gels, or a combination thereof.

54. The fuel supply of claim 52, wherein the absorbent member comprises charcoal.

55. The fuel supply of claim 52, wherein said device comprises a fuel cell.

56. A device comprising a fuel cell, an absorbent member capable of absorbing fuel and a device valve component, wherein the absorbent member is disposed proximate to the device valve component and wherein the device is connectable to a fuel supply having a fuel supply valve component such that a fuel flow path is established between the device valve component and the fuel supply valve component.

57. The device of claim 56, wherein the absorbent member comprises hydrophilic fibers or swellable gels, or a combination thereof.

58. The device of claim 56, wherein the absorbent member comprises charcoal.

59. The device of claim 56, wherein the absorbent member is adapted to absorb dischargeable fuel when the fuel supply is connected to or disconnected from the device.

60. The device of claim 56, wherein the device valve component comprises an internal seal.

61. The device of claim 56, wherein the fuel supply valve component comprises an internal seal.

* * * * *